(12) United States Patent
Barnett et al.

(10) Patent No.: US 9,367,090 B2
(45) Date of Patent: Jun. 14, 2016

(54) DOCKING CONNECTOR PLATFORM FOR MOBILE ELECTRONIC DEVICES

(71) Applicant: Plugged LLC, Boulder, CO (US)

(72) Inventors: David B. Barnett, Boulder, CO (US); Altan Nahum, Boulder, CO (US)

(73) Assignee: Plugged LLC, Boulder, CO (US)

( * ) Notice: Subject to any disclaimer, the term of this patent is extended or adjusted under 35 U.S.C. 154(b) by 92 days.

(21) Appl. No.: 14/384,663

(22) PCT Filed: Mar. 13, 2013

(86) PCT No.: PCT/US2013/030991
§ 371 (c)(1),
(2) Date: Sep. 11, 2014

(87) PCT Pub. No.: WO2013/138500
PCT Pub. Date: Sep. 19, 2013

(65) Prior Publication Data
US 2015/0077927 A1     Mar. 19, 2015

Related U.S. Application Data

(60) Provisional application No. 61/610,575, filed on Mar. 14, 2012.

(51) Int. Cl.
| | | |
|---|---|---|
| G06F 1/16 | (2006.01) | |
| H04M 1/02 | (2006.01) | |
| H04M 1/06 | (2006.01) | |

(52) U.S. Cl.
CPC ............ *G06F 1/1632* (2013.01); *G06F 1/1626* (2013.01); *G06F 1/1628* (2013.01); *G06F 1/1656* (2013.01); *G06F 1/1686* (2013.01); *G06F 1/1688* (2013.01); *H04M 1/0254* (2013.01); *H04M 1/06* (2013.01)

(58) Field of Classification Search
USPC ........ 248/206.2, 205.1, 371, 316.7, 614, 560, 248/223.41; 361/679.41, 679.01, 679.3, 361/679.31, 679.09, 679.26, 679.58, 361/679.29, 679.43, 679.27, 679.44, 361/679.55, 679.56; 455/575.8, 569.1, 455/556.1, 556.2, 575.2, 575.1, 575.6, 573; 174/535, 520, 100, 135; 345/166, 1.3, 345/168, 102, 156, 215, 92, 173, 179, 100, 345/184
See application file for complete search history.

(56) References Cited

U.S. PATENT DOCUMENTS

| | | | | |
|---|---|---|---|---|
| 7,303,282 | B2 * | 12/2007 | Dwyer ................. | H04N 9/3141 348/E5.13 |
| 2004/0172162 | A1 * | 9/2004 | Bonney ................. | A61J 7/0472 700/237 |
| 2014/0317329 | A1 * | 10/2014 | Barnett ................. | G06F 1/1632 710/304 |

*Primary Examiner* — Hung Duong
(74) *Attorney, Agent, or Firm* — Jennifer L. Bales; Macheledt Bales LLP

(57) ABSTRACT

Docking platforms formed in one of the largest-surface-area surfaces (the back surfaces) of mobile electronic devices (1, 32). Such a docking platform comprises a docking accessory cavity (3, 41, 51, 60) having a docking connection system (49) comprising one or more docking connectors (4, 5, 42, 52, 56, 58) formed within the cavity, and optionally two or more electrical contacts (19) within the cavity, the contacts electrically connected to electronics within the electronic device and constructed and arranged to allow electrical connection to detachable docking accessories (6, 8, 27, 30, 31, 33, 36, 45, 61). The docking connection system is operable to form detachable attachments to multiple independent docking accessories simultaneously. The cavities of the docking platforms are shaped to accommodate a broad range of docking accessories that are specially adapted to sit in a generally flush manner with the back surface of the mobile electronic device while attached to the docking connectors. One type of accessory (8, 27, 33) forms an assembly with an expandable accordion (10) attached to the docking platform.

20 Claims, 22 Drawing Sheets

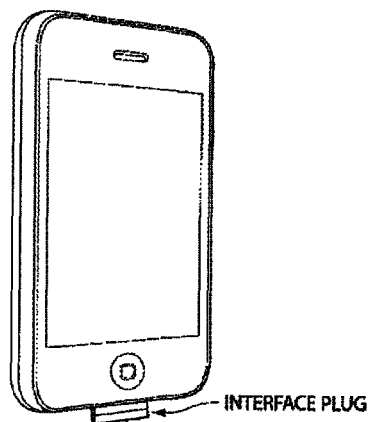
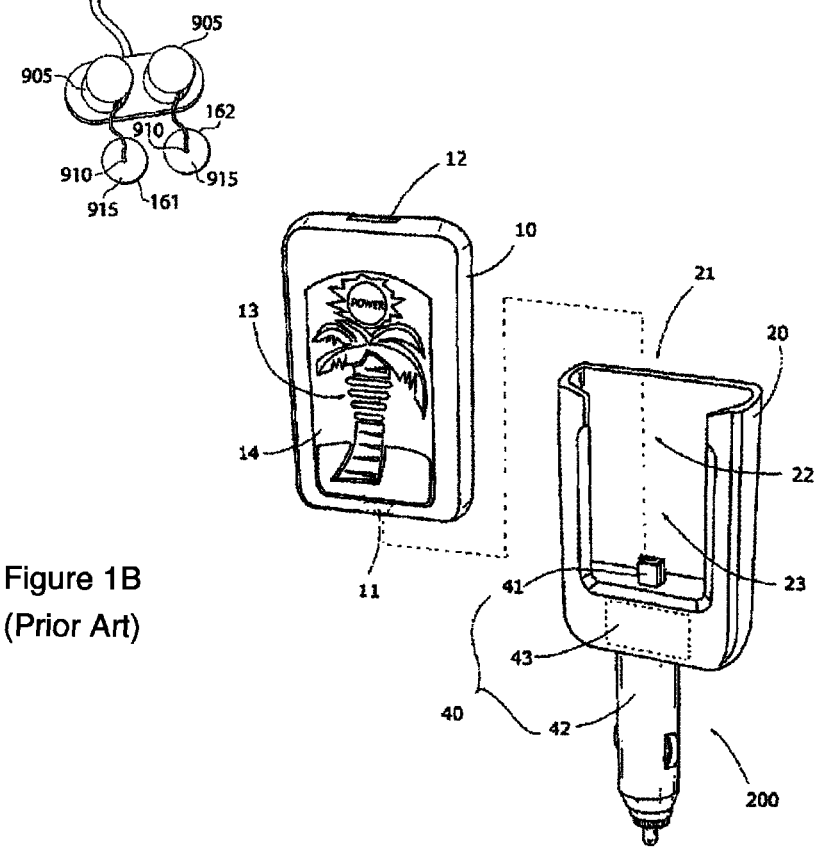
Figure 1 A
(Prior Art)
Figure 1B
(Prior Art)

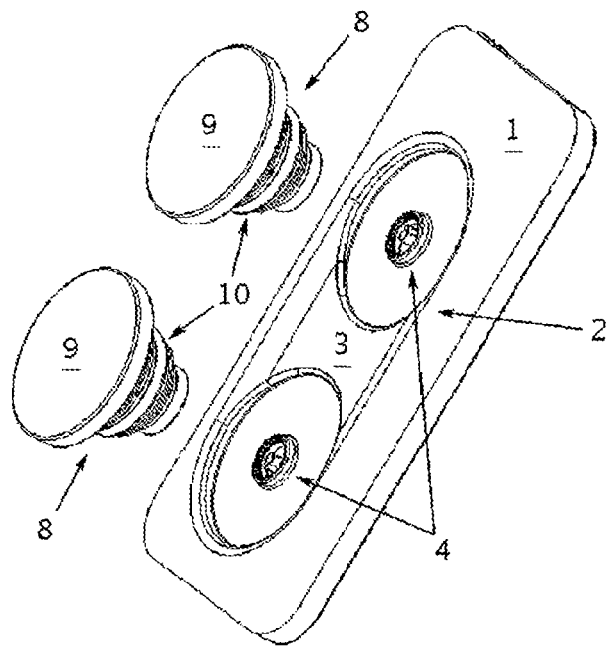
Figure 6A
Figure 6B
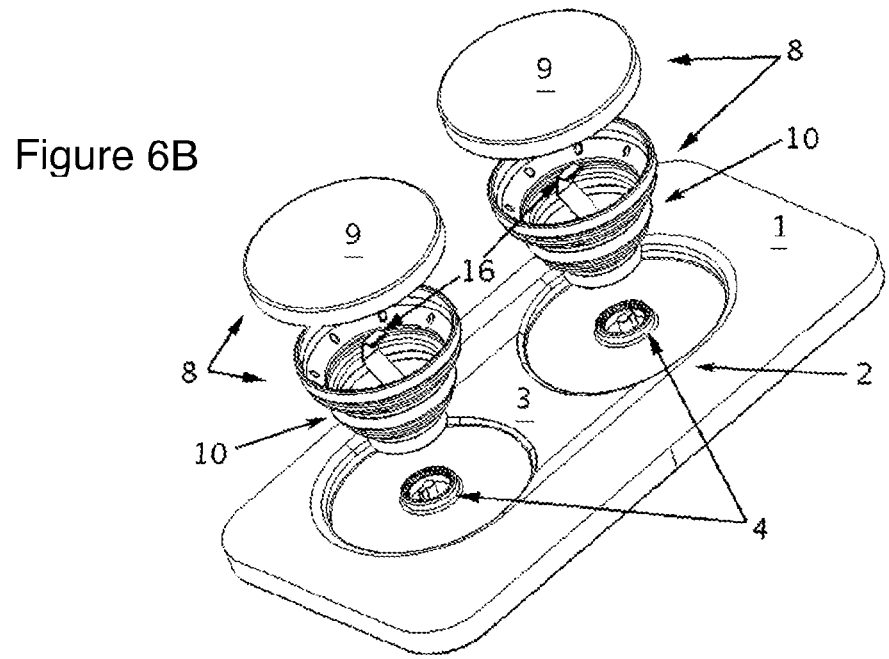

DETAIL A
SCALE 6 : 1

DOCKING CONNECTOR PLATFORM FOR MOBILE ELECTRONIC DEVICES

BACKGROUND OF THE INVENTION

1. Field of the Invention

Embodiments of the present invention relate to docking connectors for mobile electronic devices. In particular, embodiments of the present invention relate to docking connectors disposed on a largest-surface-area surface of the electronic devices.

2. Discussion of Related Art

Mobile electronic devices often comprise docking connectors, which enable the mobile electronic devices to temporarily attach to multiple external docking accessories, such as speakers and batteries, generally further enabling power and data transmission between the mobile electronic device and the docking accessories. Docking connectors are generally housed on one of the edges of the mobile electronic device, as opposed to one of the two major faces of a typical mobile electronic device, wherein the front face is generally designated by the location of a screen, should the device house a screen, and the back face is designated as the face opposite the front face. For example, the smartphone shown in FIG. 1A (Prior Art) has two major faces and four relatively narrow edges, with a docking connector housed on the bottom edge. A shortfall of housing a docking connector on the edge of a mobile electronic device is that when the device is attached to docking accessories, the resultant system is generally inconvenient for transport. If the docking accessories attach by a flexible cable to the docking connector as shown in FIG. 1A, the resultant system comprises two or more independently moving bodies, connected by the flexible cable, and is thus inconvenient for transport. If the docking accessories attach in a rigid fashion to the docking connector, the resultant system generally increases the effective magnitude of at least one of the dimensions of the mobile electronic device to a degree that renders the resultant system inconvenient for transport. This is due to the fact that the edges of mobile electronic devices generally have a relatively small surface area compared to the front and back faces of the devices; thus, to accommodate the volume of a docking accessory that is rigidly attached to such an edge, the resultant system generally extends significantly in directions away from the docking connector edge. See for example FIG. 1B (Prior Art).

To address the preceding docking-system transport problem, some docking accessories, such as certain supplemental batteries, are manufactured as parts of mobile electronic device cases. The resultant "docking cases" attach to mobile electronic devices, both at their docking connectors (as standard docking accessories attach) and around their various edges (as standard mobile electronic device cases attach), to enable the docking accessories to be transported securely against the back faces of the mobile electronic devices. See for example FIG. 1C (Prior Art). In a similar vein, some docking accessories are manufactured as parts of docking "sleeves" (or "jackets"), which attach to compatible mobile electronic devices at their side edges and at their docking connectors (some docking sleeves are themselves operable to form detachable attachments to independent docking accessories). See for example FIG. 1D (Prior Art). Docking cases and sleeves enable the majority of the volume of docking accessories to be distributed in a generally even manner across the relatively large back faces of mobile electronic devices, with the aim of minimizing effective increases in magnitude to any single dimension of the mobile electronic device and thus enabling the resultant systems to be transported in a convenient fashion. While going some way to mitigate the increase in effective size of mobile electronic devices to which docking cases and sleeves are attached, the main shortfall with this method for addressing the docking-system transport problem is that docking cases and sleeves nevertheless increase the effective size of the corresponding mobile electronic device, both in the dimension perpendicular to the back face of the mobile electronic device and in the dimension perpendicular to the face of the edge that houses the docking connector.

A second method for addressing the docking-system transport problem is to (i) recess a portion of a selected edge of a mobile electronic device to form a rectangular cavity that is open both at the selected edge and at the backside of the mobile electronic device; (ii) form a docking connector on the recessed edge; and (iii) form rails (or tracks) on the two cavity edges perpendicular to the recessed edge. See for example FIG. 1E (Prior Art). The rails serve to guide docking accessories as they are inserted into the rectangular cavity through the opening on the selected edge and to help fix the positions of the docking accessories when they are in their docked states. The rectangular cavity enables docking accessories to attach to the mobile electronic device without increasing its effective carrying size. For certain designs, the formation of the cavity may lead to an increase in the initial carrying size of the mobile device by taking up space that could otherwise be used for internal components of the device; still, the cavity enables docking accessories to attach to the device without further increasing its effective carrying size and without altering its overall contour. This method thus avoids the main shortfall with the preceding method. Nevertheless, it has several shortfalls of its own. First, it does not allow multiple docking accessories to attach simultaneously and independently to the mobile electronic device. Some docking accessories, such as supplemental camera lenses and flashes, stereo speakers, and electrophysiology sensors, naturally work together in pairs, so there is a need for a method that enables multiple docking accessories to attach simultaneously to the mobile electronic device. Furthermore, different circumstances might call for one and the same accessory to be paired with different partner accessories. For instance, a daytime circumstance might call for a supplemental camera lens accessory to be combined with a supplemental battery accessory, whereas a nighttime circumstance might call for the same camera lens to be combined instead with a supplemental flash accessory. So there is a need for a method that enables multiple docking accessories to attach both simultaneously and independently to the mobile electronic device. A second shortfall with this method is that its rail system requires the corresponding accessory cavity to be open at one edge of the mobile device. This is disadvantageous, as edge openings reduce available space for mobile-device features that are ideally located on an edge of the device (for instance, volume buttons, power buttons, built-in speakers, and built-in sensors) and, if the selected edge is tapered, as is common to create the perception that the device is only as thick as its outermost edges, the tapered boundary of the corresponding accessory cavity places adverse constraints on the design of compatible docking accessories. A third shortfall with this method is that, by fixing the positions of the outer edges of attached accessories through its rail system, it presents design obstacles for a broad range of accessories whose functionality improves with the ability to temporarily expand away from, and rotate at various angles to, the backsides of the mobile electronic devices to which they are attached (for instance, speakers, electrophysiology sensors, massage paddles, hand-pump chargers, and ultrasound transducers). A fourth shortfall with this method is that accessories whose attachment does not increase the effective carrying size of the mobile device must have a certain rectangular shape and size to mate with the rail system (and those accessories that protrude beyond the boundaries of the rectangular cavity must have a base of a certain rectangular shape and size to mate with the rail system). Different docking accessories have different ideal shapes and sizes, however. For instance, whereas certain camera lenses, speakers, and electrophysiology sensors might ideally be circular and relatively small, certain game controllers, external keyboards, and solar panels might ideally be elongated and relatively large. Ideally, a solution to the docking-system transport problem should enable a range of shapes and sizes of accessories to attach to the mobile electronic device without increasing its effective carrying size. What is needed is a docking platform that is housed on the back face of a mobile electronic device to enable multiple docking accessories of various shapes and sizes to simultaneously and independently attach to the mobile electronic device with the optional freedom to temporarily expand away from, and rotate at various angles to, the back face of the mobile device, and with at most a nominal increase to the effective magnitude of any one dimension of the mobile device. Furthermore, the docking platform should not require openings on the edges of the mobile device.

SUMMARY OF THE INVENTION

One or more embodiments of the present invention are directed to mobile electronic devices having docking connectors. A device according to the present invention includes a docking platform formed at one of the largest-surface-area surfaces of the device, generally the back face of the device. The docking platform comprises a docking connection system, the connection system comprising one or more docking connectors generally disposed in a recessed docking accessory cavity that enables docking accessories to be attached to the docking connectors without significantly increasing the effective carrying size of the mobile electronic device. The connection system is constructed to enable the docking accessory cavity to be open only at the selected surface. The accessory cavity is generally shaped and configured to accommodate a broad range of docking accessories that might be specially adapted to sit in a generally flush manner with the outermost surface of the back face of the mobile device while attached to the docking connectors. The connection system is operable to form a detachable attachment to multiple independent docking accessories simultaneously. The connection system may be further operable to form a detachable attachment to an accessory without fixing the outer edges of the accessory. The range of docking accessories that might be accommodated by the docking platforms includes, for example, batteries, solar panels, game controls, LED lights, hand-crank chargers, weather sensors, camera flashes, camera lenses, electrophysiology sensors, memory cards, keyboards, massage paddles, glucose monitors, body fat monitors, breathalyzers, ultrasound transducers, and pulse oximeters.

In one embodiment, the docking platform is integrally formed with the rest of the body of the mobile electronic device. The platform comprises an accessory cavity that has a generally oval shape, this cavity further comprising two circular cavities, one constituting each end of the oval cavity, with a depressed region between the two cavities constituting the middle part of the oval cavity. Each of the two circular cavities has an annular docking connector disposed at its center. Each docking connector comprises (i) an annular female snap-fit feature, for attaching docking accessories securely to the docking platform; (ii) 30 electrical contacts disposed evenly around the inner edge of the female snap-fit feature, for transmission of power and data to and from docking accessories; and (iii) a male index key, to ensure that the electrical contacts on a docked accessory mate with the appropriate contacts on the docking connectors. The electrical contacts are formed of gold-plated nickel-plated copper, with copper pads, and the remainder of the platform is formed of the same hard material as the rest of the body of the mobile electronic device.

Other embodiments include variations in (i) shape of platform; (ii) size of platform; (iii) number of docking accessory cavities; (iv) shape of docking accessory cavities; (v) size of docking accessory cavities; (vi) number of docking connectors; (vii) shape of docking connectors; (viii) size of docking connectors; (ix) mode of attachment of docking connectors to docking accessories; (x) configuration of electrical contacts; (xi) number of electrical contacts (including zero); (xii) mode of attachment of platform to the body of the mobile electronic device; and (xiii) materials of the platform and its components.

A docking platform according to the present invention is formed in a selected one of two largest-surface-area surfaces of a mobile electronic device and comprises a recess formed within the selected surface, the recess forming a docking accessory cavity, the accessory cavity optionally forming a further recess, a docking connection system formed within the docking accessory cavity, the docking connection system comprising one or more docking connectors, the docking connection system operable to form a detachable attachment to at least two independent docking accessories simultaneously, the docking connection system constructed to enable the docking accessory cavity to be open only at the selected surface.

The docking connection system might be operable to form a detachable attachment to a docking accessory without fixing the positions of the outer edges of the accessory.

The docking platform might comprise two (or more) electrical contacts within the docking accessory cavity, the contacts electrically connected to electronics within the electronic device and constructed and arranged to allow electrical connection to the docking accessory when the docking accessory is attached to the docking connector.

The docking platform might enable power and data transmission between the mobile electronic device and the docking accessories by electrical connection to the docking accessories, or the mobile electronic device might enable at least one of power or data to be transmitted between the mobile device and the accessories through wireless technology.

The docking connection system might form a detachable mechanical bond with docking accessories, or a detachable magnetic bond.

The docking connection system might comprise a single docking connector operable to form a detachable attachment to two or more independent docking accessories simultaneously (for instance, the docking connection system might comprise a single magnetic element operable to form a detachable magnetic attachment to two or more independent docking accessories simultaneously), or it might comprise more than one docking connector jointly operable to form a detachable attachment to two or more independent docking accessories simultaneously.

The docking connector might be generally circular.

The docking accessory cavity might be elongated.

The selected surface in which the docking platform is formed might be substantially flush with an outwardly facing surface of the docking accessory when the docking accessory is attached to the docking connection system.

A docking system according to the present invention comprises a docking platform formed in a selected one of two largest-surface-area surfaces of a mobile electronic device (comprising a recessed docking accessory cavity formed within the selected surface, a docking connection system formed within the docking accessory cavity, the docking connection system operable to form a detachable attachment to at least two independent docking accessories simultaneously, the docking connection system constructed to enable the docking accessory cavity to be open only at the selected surface, and optionally two (or more) electrical contacts within the docking accessory cavity, the contacts electrically connected to electronics within the electronic device), and a docking accessory constructed and arranged to form a detachable attachment to the docking connection system, the docking accessory further constructed to allow at least one of either data or power transmission between the mobile electronic device and the docking accessory.

The docking connection system might be further operable to form an attachment with a docking accessory without fixing the positions of the outer edges of the attached accessory.

The docking accessory might be further constructed and arranged to allow electrical connection to the electrical contacts of the docking connection system when the docking accessory is attached to the docking connection system.

The docking system might further comprise an accordion capable of extending outward from the selected surface and retracting back toward the selected surface, the accordion distal end attached to the docking accessory body. A flexible circuit (such as a flat flex circuit or a flexible cable) might be formed within the accordion to enable electrical connection between the docking accessory body and the mobile electronic device.

The docking accessory might comprise a battery, solar panel, game control, LED light, hand-crank charger, weather sensor, camera flash, camera lens, electrophysiology sensor, memory card, keyboard, massage paddle, glucose monitor, body fat monitor, breathalyzer, ultrasound transducer, or pulse oximeter, among other docking accessories.

A docking accessory system for a mobile electronic device according to the present invention comprises a docking accessory body, an accordion constructed to attach to a selected one of two largest-surface-area surfaces of the mobile electronic device and capable of extending outward from the selected surface and retracting back toward the selected surface, the accordion distal end attached to the docking accessory body, and the docking accessory comprising electronics enabling transmission of at least one of data or power between the accessory and the mobile electronic device.

The docking accessory system might further comprise a flexible circuit formed within the accordion and configured to electrically connect to the docking accessory body and the mobile electronic device.

The method of allowing attachment of a docking accessory to a mobile electronic device according to the present invention comprises the steps of:
(a) forming a recessed docking accessory cavity within a selected one of two largest-surface-area surfaces of the mobile electronic device; and
(b) forming a docking connection system within the docking accessory cavity, the connection system constructed and arranged to form a detachable attachment a docking accessory, to enable the docking accessory cavity to be open only at the selected surface, and to enable attached docking accessories to temporarily extend away from, and articulate at various angles to, the selected surface of the mobile electronic device.

Those skilled in the art will appreciate that configurations similar to embodiments shown and described herein may be used.

BRIEF DESCRIPTION OF THE DRAWINGS

FIG. 2 comprises FIGS. 2A, 2B, and 2C.

FIG. 3 comprises FIGS. 3A and 3B.

FIG. 4 comprises FIGS. 4A, 4B, and 4C.

FIG. 6 comprises FIGS. 6A, 6B, 6C, 6D, 6E, and 6F. FIG. 6A is an isometric view of the mobile electronic device with docking platform of FIG. 2A and two unattached expandable generic docking accessories in their expanded states.

FIG. 6B is an exploded isometric view of the mobile electronic device with docking platform of FIG. 2A and two unattached expandable generic docking accessories in their expanded states.

FIG. 9 comprises FIGS. 9A, 9B, 9C, 9D, and 9E.

FIG. 10 comprises FIGS. 10A, 10B, 10C, and 10D.

FIG. 11 comprises FIGS. 11A, 11B, and 11C.

FIG. 12 comprises FIGS. 12A, 12B, and 12C.

FIG. 13 comprises FIGS. 13A, 13B, and 13C.

FIG. 14C is a back view of the mobile electronic device with the game controller accessory of FIG. 14A docked in a partially open state.

FIG. 15 comprises FIGS. 15A and 15B.

DETAILED DESCRIPTION OF THE INVENTION

Figure 1D:
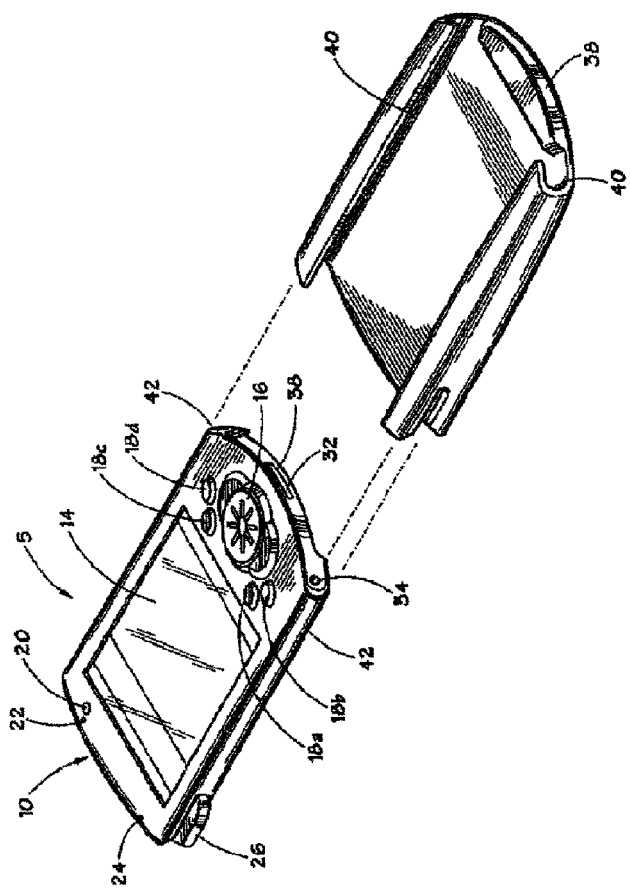
FIG. 1 (Prior Art) comprises FIG. 1A, showing a cell phone device with a typical end connector and a cable-connected accessory, FIG. 1B, showing a device with an end connector and a rigid partial-case accessory, FIG. 1C, showing a device with an end connector and a rigid full-case accessory, FIG. 1D, showing a device and a docking sleeve, the device and sleeve specially adapted to mate with each other, and FIG. 1E, showing a device and a rectangular dummy accessory, the device and dummy accessory specially adapted to enable the dummy accessory to attach to rails on the inner edges of the rectangular cavity on the backside of the device without increasing the effective carrying size of the device.
Figure 1C:
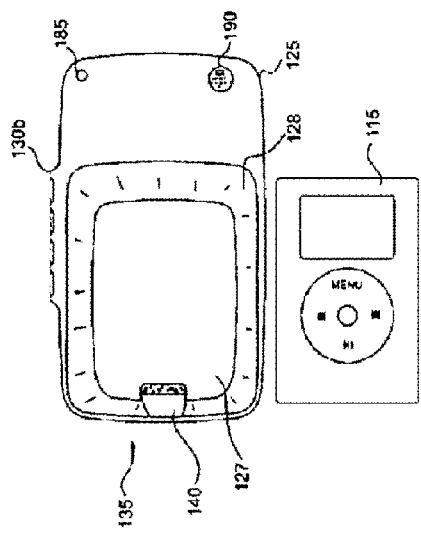
Figure 1C:
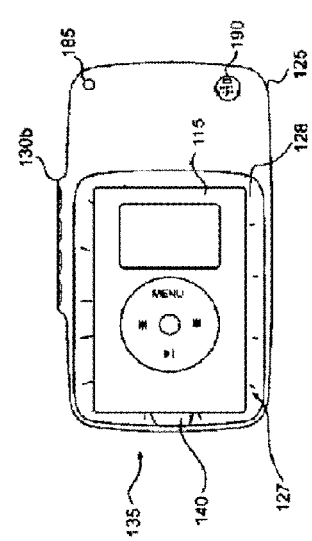
Figure 1E:
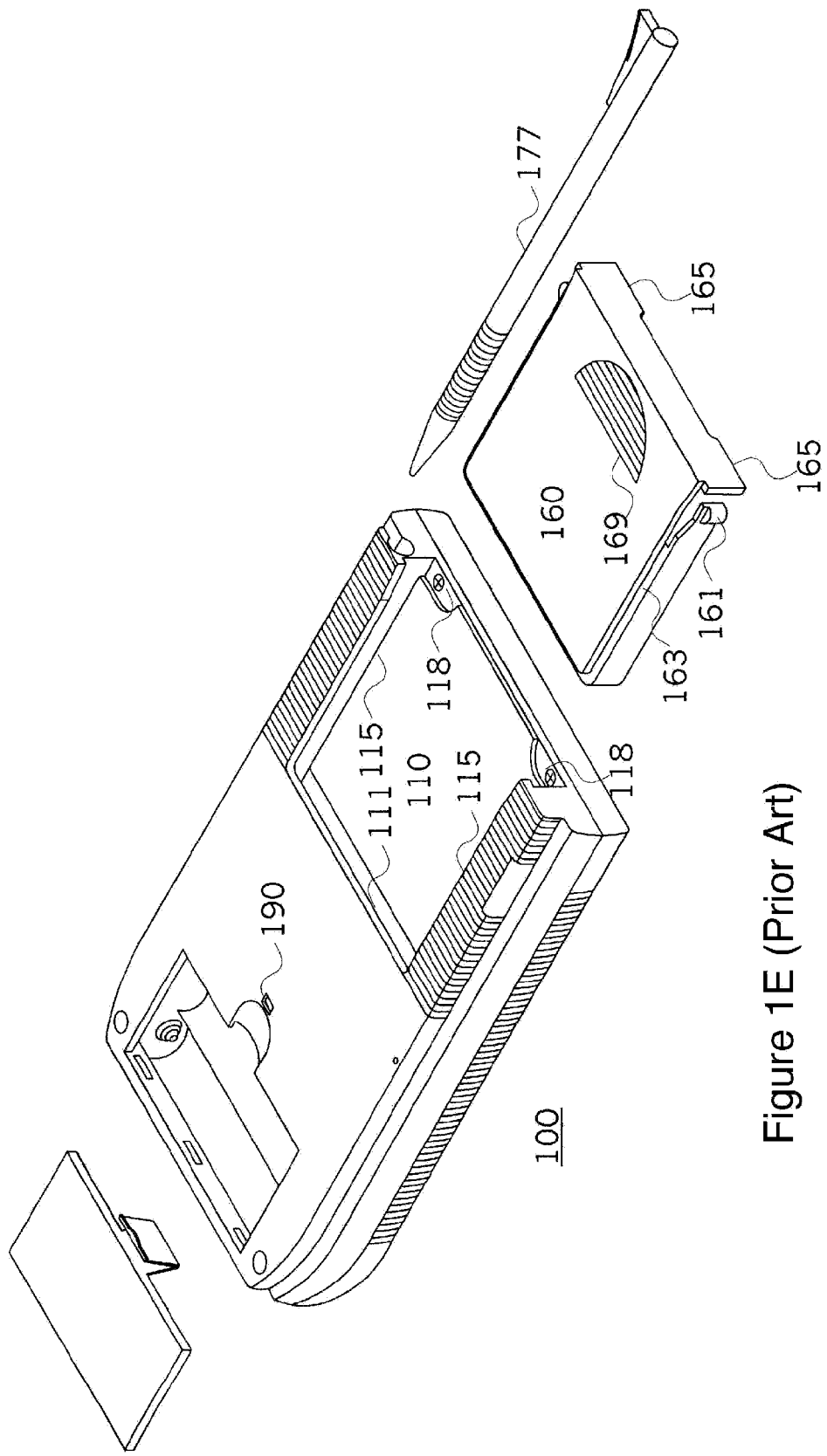

The following table lists elements of the illustrated embodiments of the invention and their associated reference numbers for convenience.

| Ref. No. | Element |
|---|---|
| 1. | Mobile electronic device |
| 2. | Docking platform |
| 3. | Docking accessory cavity first embodiment |
| 4. | Docking connector first embodiment |
| 5. | Docking connector second embodiment |
| 6. | Basic generic docking accessory first embodiment |
| 7. | Basic generic docking accessory first embodiment male snap-fit connector |
| 8. | Expandable generic docking accessory |
| 9. | Expandable generic docking accessory body |
| 10. | Expandable generic docking accessory accordion |
| 11. | Expandable generic docking accessory accordion vent |
| 12. | Expandable generic docking accessory accordion vertical wall |
| 13. | Expandable generic docking accessory accordion flexural hinge |
| 14. | Expandable generic docking accessory accordion flipper wall |
| 15. | Accordion male snap-fit connector |
| 16. | Expandable generic docking accessory accordion flex circuit |
| 17. | Expandable generic docking accessory accordion connector female index key |
| 18. | Expandable generic docking accessory accordion male connector electrical contacts |
| 19. | Docking connector electrical contacts |
| 20. | Expandable generic docking accessory accordion flex circuit male connector electrical contacts |
| 21. | Expandable generic docking accessory body female connector |
| 22. | Basic generic accessory first embodiment connector female index key |
| 23. | Basic generic accessory first embodiment connector electrical contacts |
| 24. | Docking connector first embodiment female snap-fit |
| 25. | Expandable accessory body female connector port |
| 26. | Docking connector first and second embodiment male index key |
| 27. | Speaker accessory |
| 28. | Speaker accessory body |
| 29. | Speaker accessory piezoelectric speaker |
| 30. | Solar charger accessory |
| 31. | Supplemental battery accessory |
| 32. | Tablet device |
| 33. | Electrophysiology sensor accessory |
| 34. | Electrophysiology sensor accessory body |
| 35. | Electrophysiology sensor accessory electrode |
| 36. | Game controller accessory |
| 37. | Game controller accessory sliding control panel |
| 38. | Game controller accessory base |
| 39. | Game controller accessory buttons |
| 40. | Game controller accessory base tracks |
| 41. | Generic docking accessory cavity |
| 42. | Docking connector third embodiment |
| 43. | Docking connector third embodiment connector cavities |
| 44. | Docking connector third embodiment female aligning element |
| 45. | Basic generic docking accessory second embodiment |
| 46. | Basic generic docking accessory second embodiment male aligning element |
| 47. | Basic generic docking accessory second embodiment electrical contact |
| 48. | Basic generic docking accessory second embodiment contact insulator |
| 49. | Docking connection system |
| 50. | Docking connector third embodiment magnetic attachment system |
| 51. | Docking accessory cavity second embodiment |
| 52. | Docking connector fourth embodiment |
| 53. | Docking connector fourth embodiment connector cavity |
| 54. | Docking connector fourth embodiment female aligning element |
| 55. | Docking connector fourth embodiment magnetic attachment system |
| 56. | Docking connector fifth embodiment |
| 57. | Docking connector fifth embodiment spring tab |
| 58. | Docking connector sixth embodiment |
| 59. | Docking connector sixth embodiment magnetic attachment system |
| 60. | Docking accessory cavity third embodiment |
| 61. | Generic docking accessory |
| 62. | Docking connector fifth embodiment fixed tab |

Figure 2A:
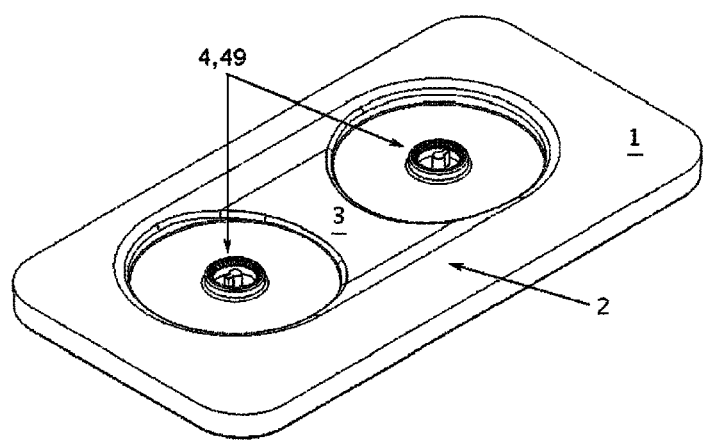
FIG. 2A is an isometric back view of a mobile electronic device with a docking platform according to at least one embodiment of the one or more present inventions.
Figure 2B:
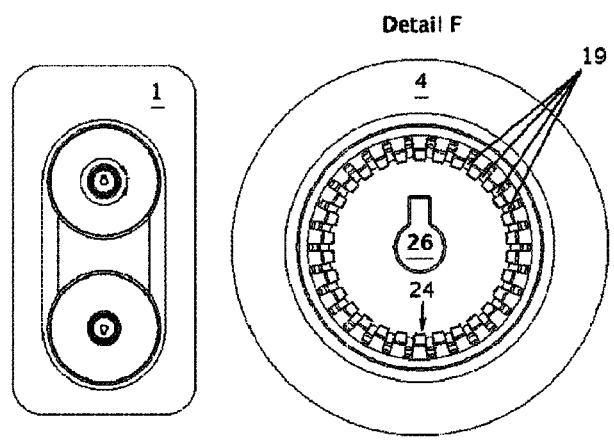
FIG. 2B is a back view of the mobile electronic device with a docking platform of FIG. 2A, with a detailed view of one of the docking connectors.
Figure 2C:
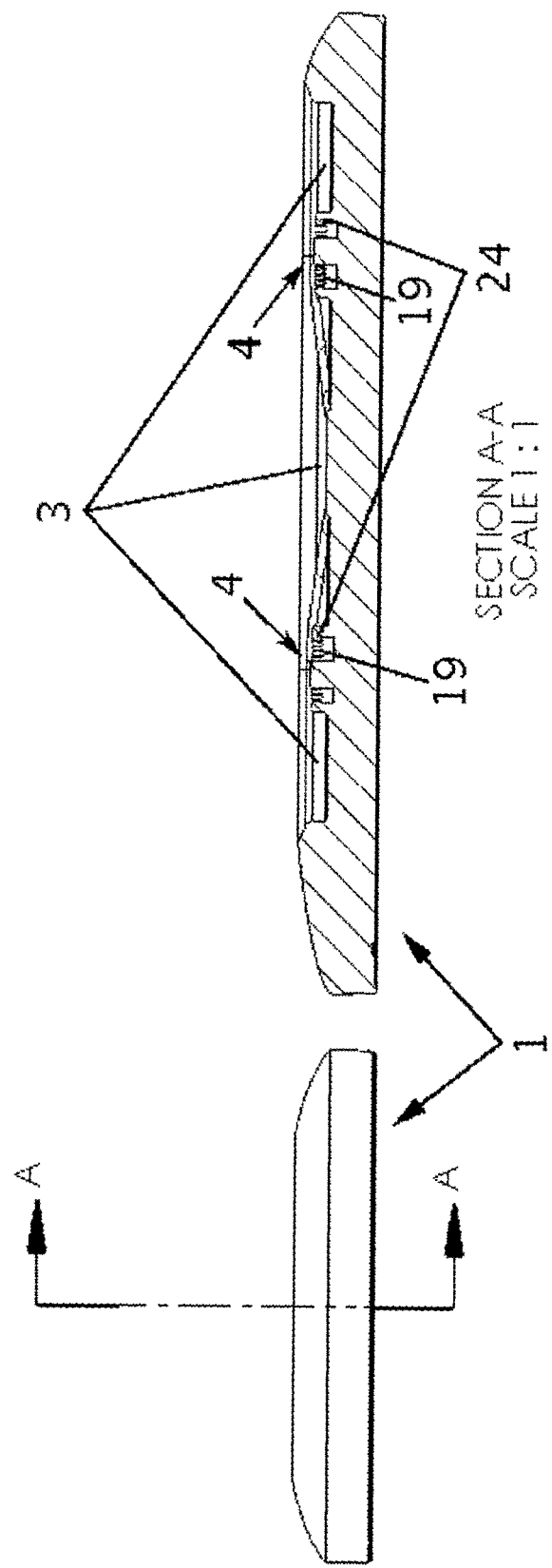
FIG. 2C is side cutaway view of the mobile electronic device with a docking platform of FIG. 2A.
Figure 3A:
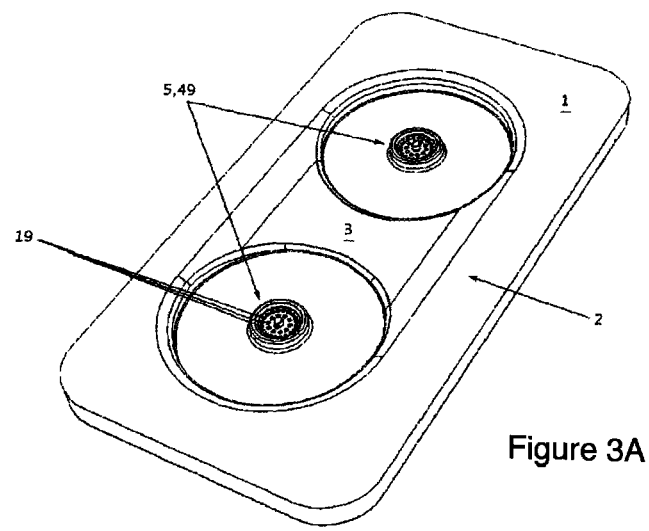
FIG. 3A is an isometric view of a mobile electronic device with a docking platform according to an embodiment wherein the electrical contacts of the docking connectors are disposed in sockets at the base of the docking connectors. This is an alternative to the embodiment of FIG. 2A, wherein the electrical contacts of the docking connectors are disposed evenly around the inner edge of the female snap-fit feature of the docking connectors.
Figure 3B:
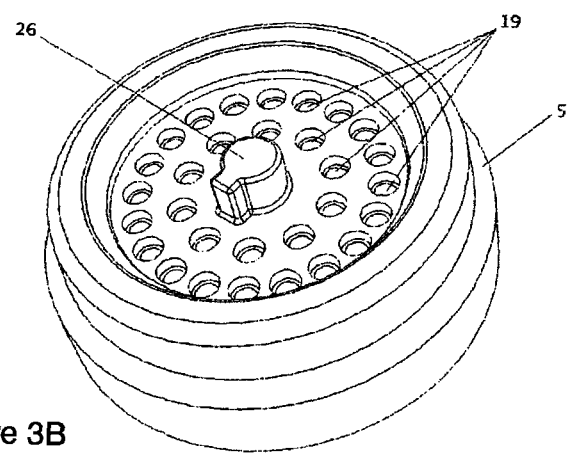
FIG. 3B is a detailed view of one of the docking connectors of FIG. 3A.

FIGS. 2A-C illustrate a first embodiment of docking connectors 4 according to the present invention. FIGS. 3A and 3B illustrate a second embodiment of docking connectors 5. In both of these cases two (or more) electrical contacts are arranged in a circular pattern, although other patterns and shapes of connectors are possible. Contacts 19 might be organized in any convenient pattern. As an example, a pin docking connector is arranged as shown in Table 1. The same contacts could be arranged in various circular patterns to form, for example, the connectors in FIG. 2 or FIG. 3 if desired. Depending on the specific docking connector configuration of the mobile electronic device and what accessory is to be used, various pins are connected and active.

TABLE 1

| Pin | Name | Description |
|---|---|---|
| 1 | GND | Ground |
| 2 | V+ Out | Power Out (to docking accessory) |
| 3 | V+ In | Power In (from docking accessory) |
| 4 | D+ | Data Positive |
| 5 | D− | Data Negative |

TABLE 1-continued

| Pin | Name | Description |
| --- | --- | --- |
| 6 | Detection/Identification/ Configuration | (optional) |
| 7 | Clock | (optional) |
| 8 and greater | Expansion | (optional) |

FIG. 2 comprises FIGS. 2A, 2B, and 2C. FIG. 2A is an isometric back view of a mobile electronic device 1 with a first embodiment of a docking platform 2 comprising a docking connection system 49, the connection system comprising two docking connectors 4 situated in accessory cavity 3. FIG. 2B is a back view of mobile electronic device 1 with a docking platform of FIG. 2A and a detailed view of one of the docking connectors 4 comprising female snap-fit 24, male index key 26, and docking connector electrical contacts 19. FIG. 2C is side cutaway view of device 1 with a docking platform 2 of FIG. 2A. In this embodiment, circular arrays of docking connector electrical contacts 19 are disposed evenly around the inner edge of female snap-fits 24 of docking connectors 4.

FIG. 3 comprises FIGS. 3A and 3B. FIG. 3A is an isometric view of a mobile electronic device 1 with a docking platform 2 according to a second embodiment of the present invention, wherein the electrical contacts 19 of the docking connectors 5 of the docking connection system 49 are disposed in concentric circles and form sockets at the base of the docking connectors. FIG. 3B is a detailed view of one of the docking connectors 5 of FIG. 3A. This is an alternative to the embodiment of FIG. 2A, wherein the electrical contacts 19 of docking connectors 4 are disposed evenly around the inner edge of female snap-fit feature 24 of the docking connectors. These connectors 5 also include male index keys 26.

Figure 4A:
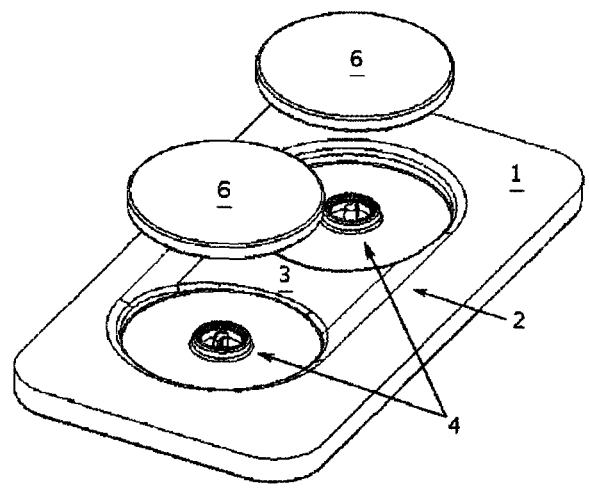
FIG. 4A is an isometric view of the mobile electronic device with docking platform of FIG. 2 and two unattached basic generic docking accessories.
Figure 4B:
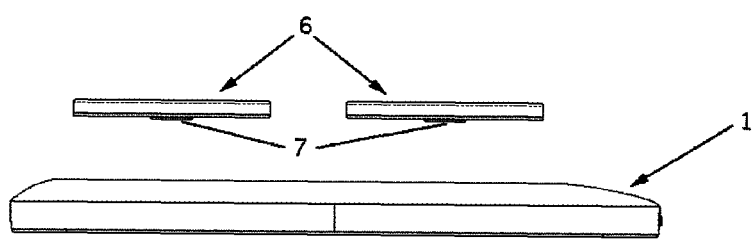
FIG. 4B is a side view of the mobile electronic device with docking platform of FIG. 2A and two unattached basic generic docking accessories.
Figure 4C:
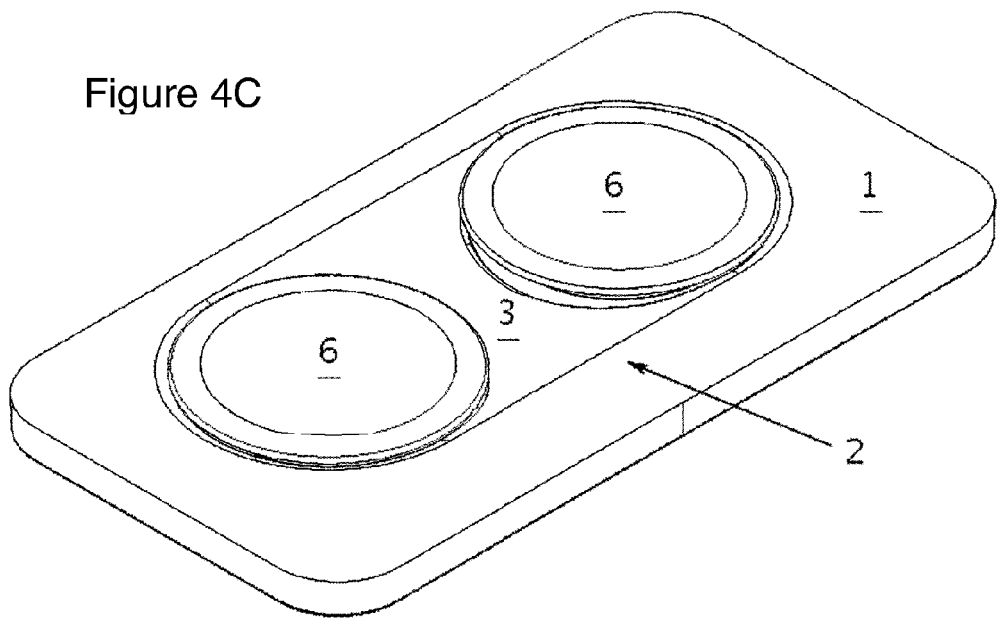
FIG. 4C is an isometric view of the mobile electronic device with docking platform of FIG. 2A with two basic generic docking accessories attached to the docking connectors of the docking platform.

FIG. 4 comprises FIGS. 4A, 4B, and 4C. FIG. 4A is an isometric view of mobile electronic device 1 with docking platform 2 of FIG. 2 and two unattached basic generic docking accessories 6. FIG. 4B is a side view of the arrangement of FIG. 4A, showing basic generic docking accessories 6 each with a docking accessory male snap-fit 7. FIG. 4C is an isometric view of the arrangement of FIG. 4A, but with docking accessories 6 attached to docking connectors 4 of docking platform 2. Note that docking accessory cavity 3 in this embodiment allows the back surface of device 1 to be substantially flat even when accessories 6 are snapped into place. This is a convenient arrangement since accessories 6 do not increase the thickness of device 1 or catch on clothing or the like. Even when accessories 6 are too thick to sit flush with the back surface of device 1, cavity 3 minimizes the interference caused by accessories 6.

Figure 5:
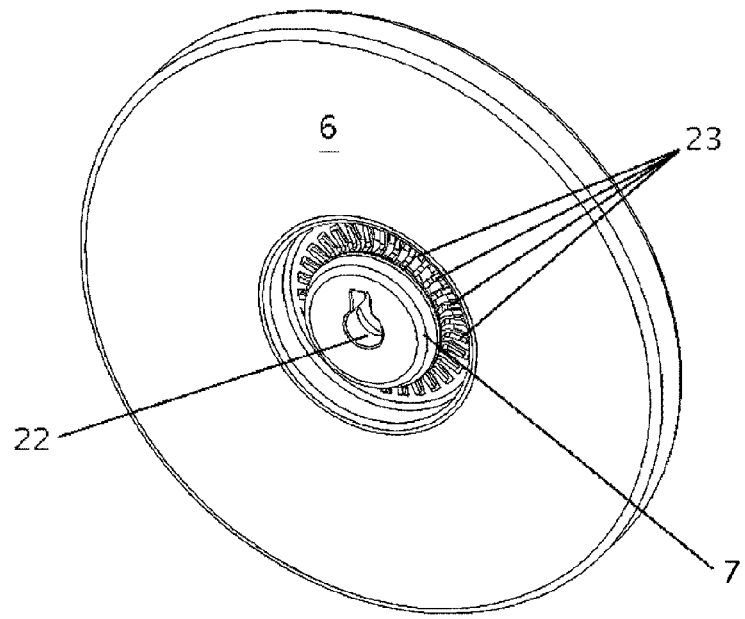
FIG. 5 is a detailed isometric bottom view of a basic generic docking accessory.

FIG. 5 is a detailed isometric bottom view of basic generic docking accessory 6. Docking accessory 6 of FIG. 5 is configured for docking connector 4 as shown in FIG. 2. Female index key 22 helps align accessory 6 properly with connector 4 as male snap-fit connector 7 mates with female snap-fit 24 and accessory connector electrical contacts 23 make contact with docking connector electrical contacts 19.

FIG. 6 comprises FIGS. 6A, 6B, 6C, 6D, 6E, and 6F. FIG. 6 illustrates one very useful type of extendable docking accessory assembly 8 formed of docking accessory body 9 attached to docking accessory accordion 10. Expandable docking accessory assembly 8 can temporarily extend outward from the back of device 1 by expanding accessory accordion 10. Accessory assembly 8 is very similar to the sockets (comprising in general an accordion and an end cap) as taught in U.S. patent application Ser. No. 13/403,729 to the present inventor.

FIG. 6A is an isometric view of mobile electronic device 1 with docking platform 2 of FIG. 2A and two unattached docking accessory assemblies 8 in their expanded states. FIG. 6B is an exploded isometric view of the arrangement of FIG. 6A, showing docking accessory bodies 9 separated from accordions 10. Flex circuits 16 are disposed within accordions 10.

Figure 6C:
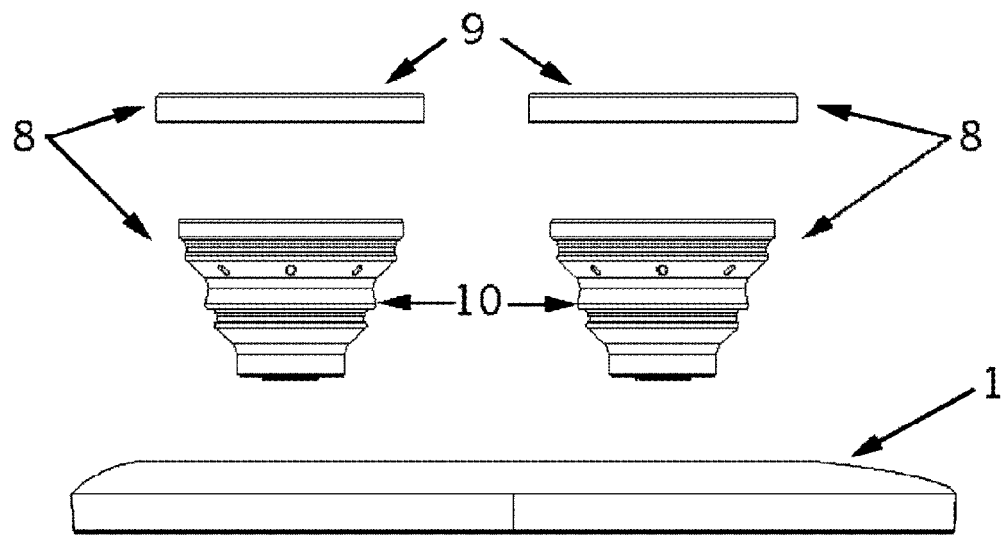
FIG. 6C is an exploded side view of the mobile electronic device with docking platform of FIG. 2A and two unattached expandable generic docking accessories in their expanded states.
Figure 6D:
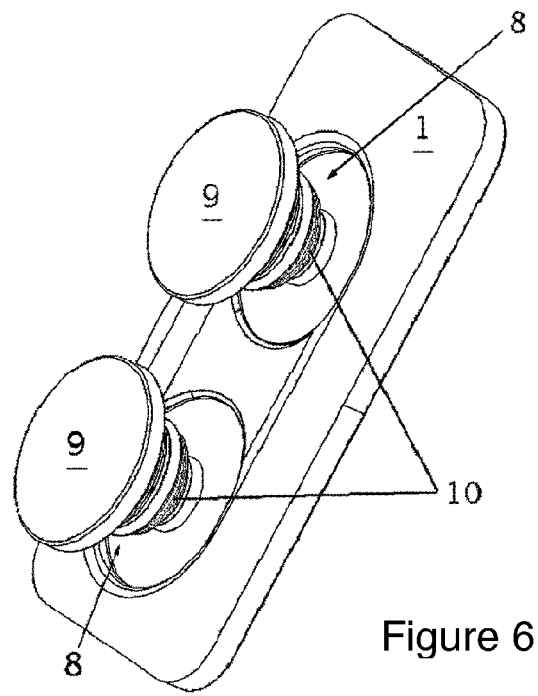
FIG. 6D is an isometric view of the mobile electronic device with docking platform of FIG. 2 and two attached expandable generic docking accessories in their expanded states.

FIG. 6C is an exploded side view the arrangement of FIG. 6B. FIG. 6D is an isometric view of the arrangement of FIG. 6A, where accessory assemblies 8 are attached to docking connectors 4.

Figure 6E:
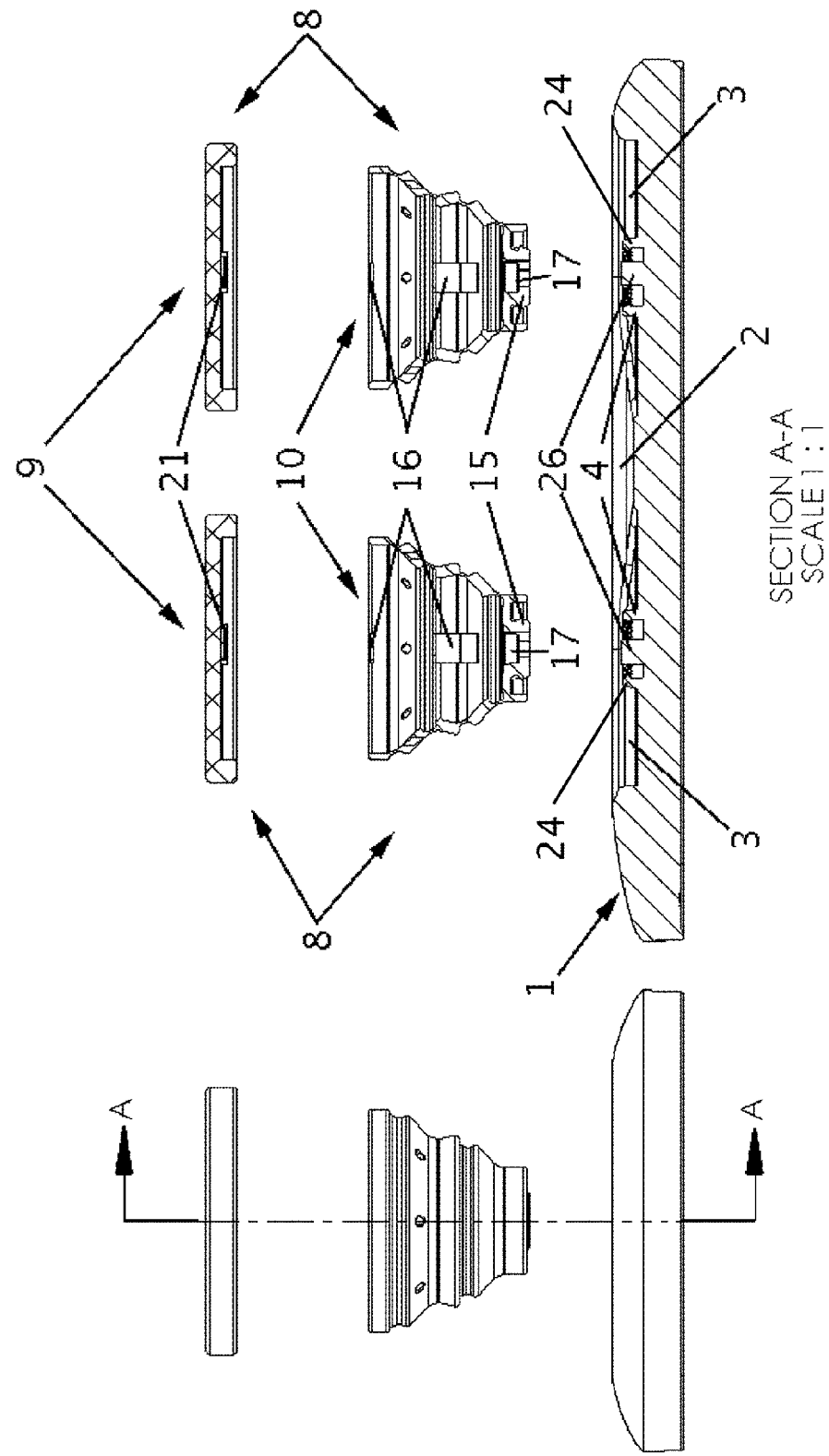
FIG. 6E is an exploded side cutaway view of the mobile electronic device with a docking platform of FIG. 2A with unattached expandable generic docking accessories in their expanded states.
Figure 6F:
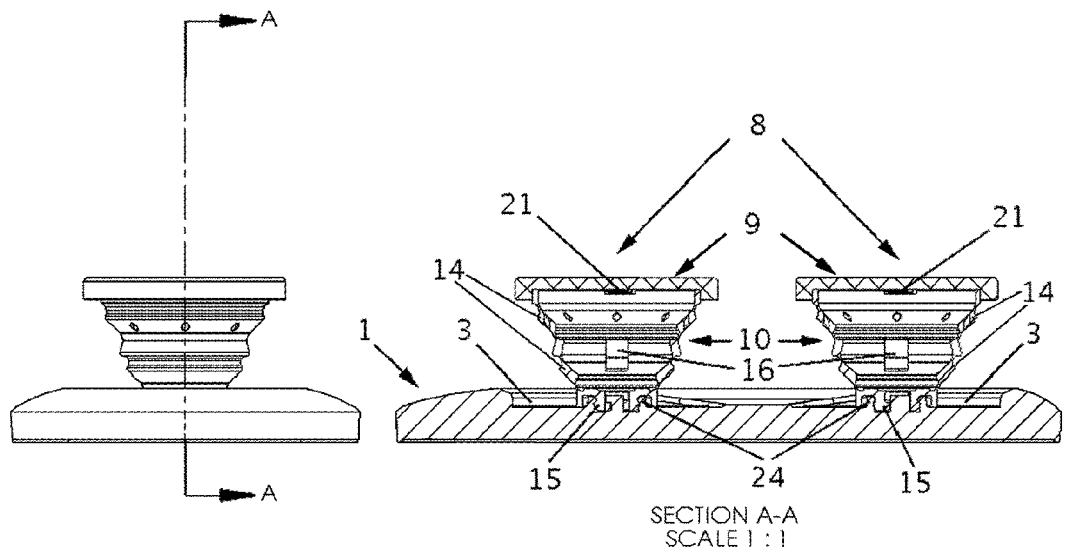
FIG. 6F is a side cutaway view of the mobile electronic device with a docking platform of FIG. 2A with attached expandable generic docking accessories in their expanded states.

FIG. 6E is an exploded side cutaway view of the arrangement of FIGS. 6B and 6C. Female connector 21 can be seen within accessory 9. Accordion 10 comprises accordion flex circuit 16 which allow accordions 10 to collapse flat against the back surface of device 1, within cavity 3. Female index key 17 aligns with male index key 26 to ensure proper connection. FIG. 6F is a side cutaway view of the arrangement of FIG. 6E, assembled. Male snap-fit connector 15 attaches to docking connector 4 female snap-fit 24. Bi-stable accordion flipper walls 14 are in their upward states.

Figure 7:
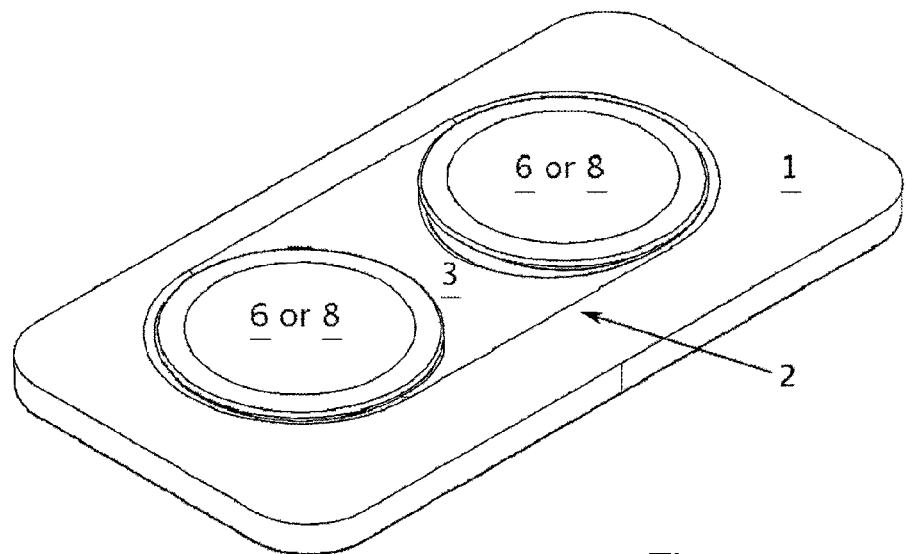
FIG. 7 is an isometric view of the mobile electronic device with a docking platform of FIG. 2A with attached generic docking accessories that are either basic accessories or expandable accessories in their collapsed states.

FIG. 7 is an isometric view of mobile electronic device 1 with a docking platform of FIG. 2 or FIG. 3, with attached generic docking accessories that are either basic accessories 6 or expandable docking accessory assemblies 8 in their collapsed states.

Figure 8:
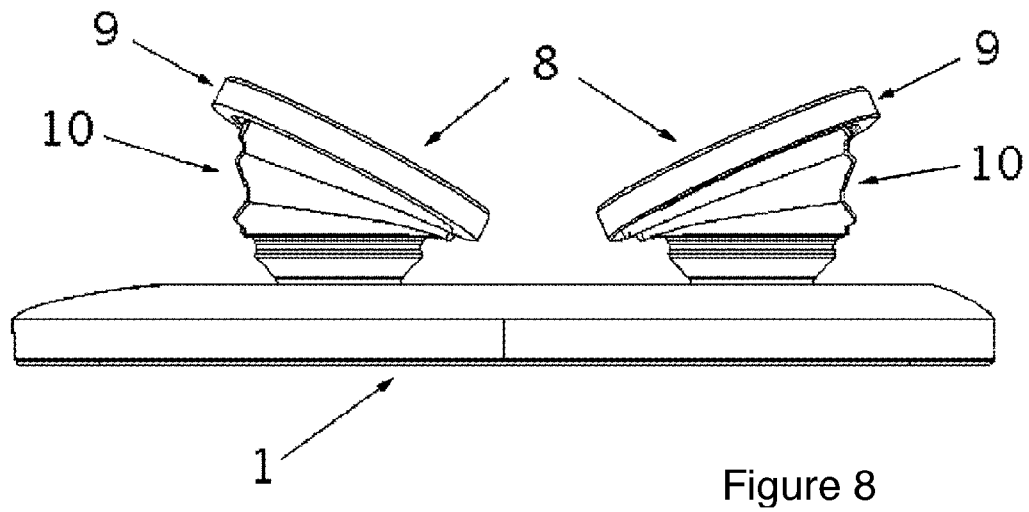
FIG. 8 is a side view of the mobile electronic device with a docking platform of FIG. 2A with attached expandable generic docking accessories in one of their partially collapsed states, wherein the bodies of the docking accessories are rotated at oblique angles to the back surface of the mobile device.

FIG. 8 is a side view of mobile electronic device 1 with expandable docking accessory assemblies 8 in one of their partially collapsed states. This configuration is useful for orienting the faces of certain docking accessories, fore example electrophysiology devices such as ECG accessories, for optimal functioning.

Figure 9A:
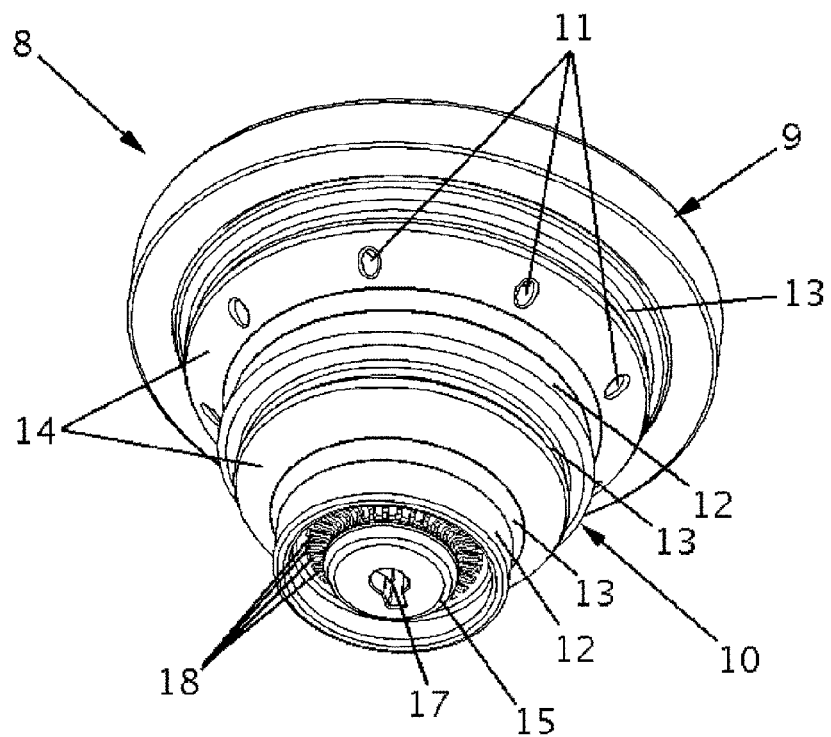
FIG. 9A is an isometric bottom view of an expandable generic docking accessory in its fully expanded state.

FIG. 9 comprises FIGS. 9A, 9B, 9C, 9D, and 9E. FIG. 9A is an isometric bottom view of an extendable docking accessory assembly 8 in its fully expanded state. Male electrical contacts 18 are configured to engage female electrical contacts 19 of docking connector 4 as shown in FIG. 2. Female index key 17 aligns with male index key 26 to ensure proper connection. During the collapse of accessory assembly 8, flexural hinges 13 flex to allow vertical walls 12 to move into a stable concentric configuration as flipper walls 14 of accordion 10 move from their current stable upward state, with their outer edges above their inner edges, to a stable downward state, whereby their outer edges are below their inner edges.

Figure 9B:
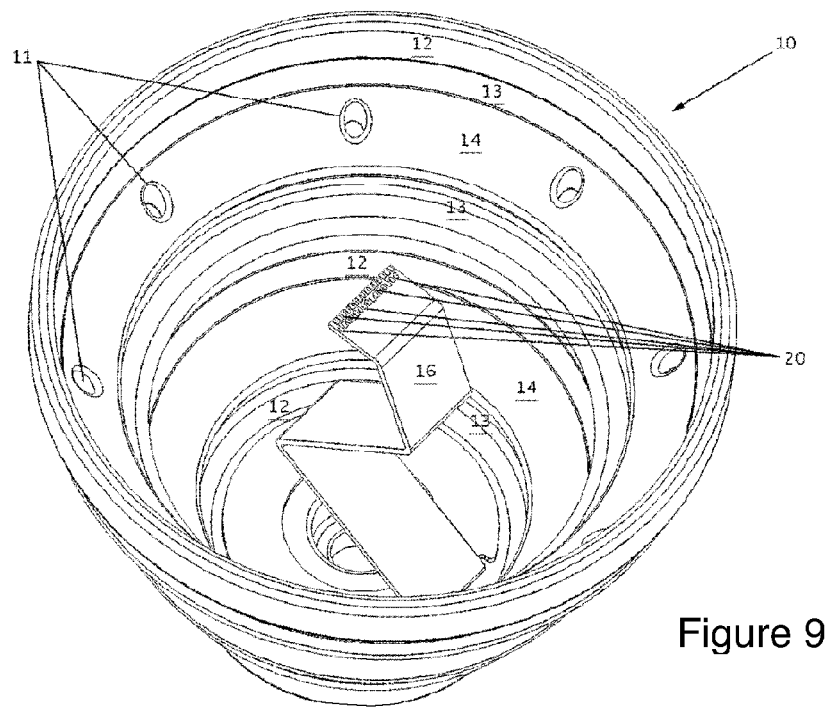
FIG. 9B is an isometric top view of an expandable generic docking accessory accordion of FIG. 9A in its fully expanded state.
Figure 9C:
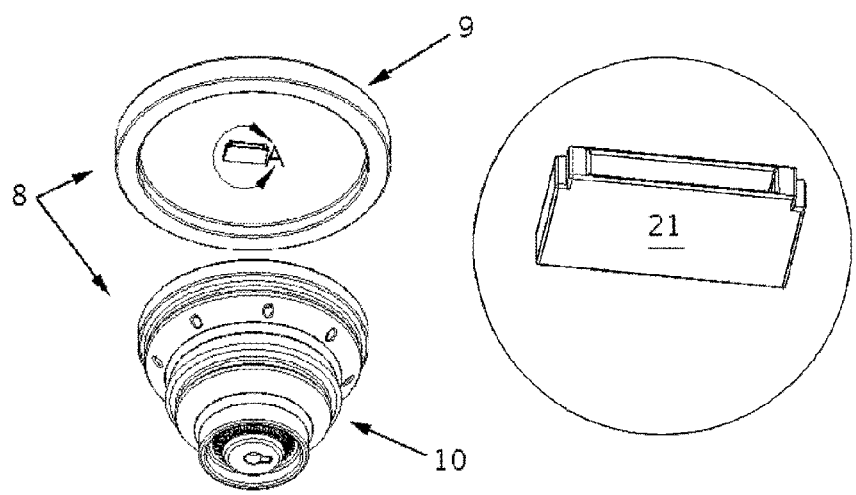
FIG. 9C is an exploded, isometric, bottom view of the expandable generic docking accessory of FIG. 9A in its fully expanded state, with a detailed view of the expandable generic docking accessory body female flex-circuit connector.
Figure 9D:
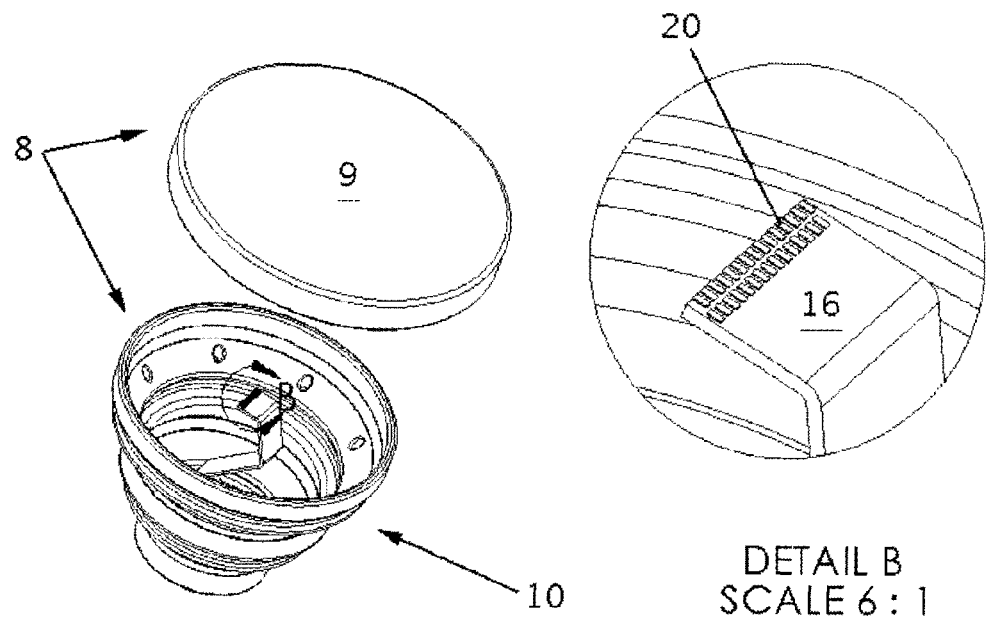
FIG. 9D is an exploded, isometric, top view of the expandable generic docking accessory of FIG. 9A in its fully expanded state, with a detailed view of the expandable generic docking accessory accordion flex circuit.
Figure 9E:
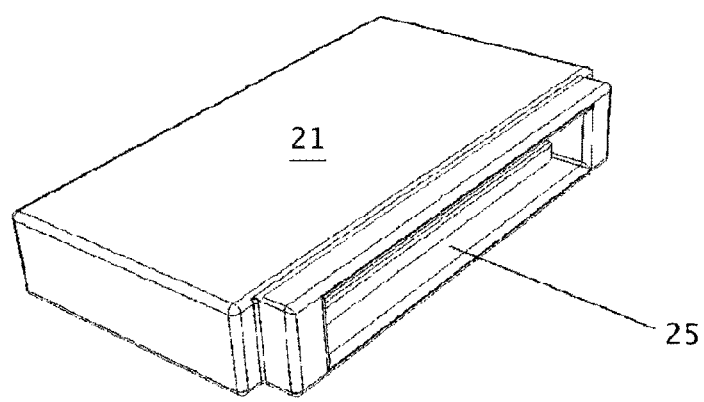
FIG. 9E is an isometric view of the expandable generic docking accessory body female connector of FIG. 9C.

FIG. 9B is an isometric top view of accordion 10 of FIG. 9A. FIG. 9C is an exploded, isometric, bottom view of accessory 8 and accordion 10, and FIG. 9D is a top view of the same arrangement. An accordion flex circuit 16 is disposed within accordion 10, and provides electrical connection between device 1 (via contacts 19, shown in FIG. 2B, and 18, shown in FIG. 9A, as described above) and accessory body 9, via connector 21. FIG. 9E is an isometric view of accessory connector 21. Contacts 20 are inserted into port 25 to connect accessory body 9. As an option, accessory body 9 might be detachable from accordion 10.

Figure 10A:
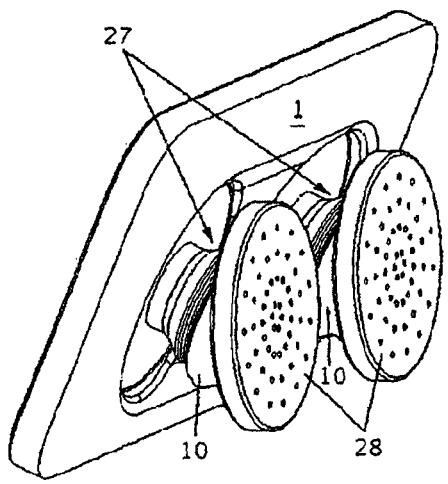
FIG. 10A is an isometric view of the mobile electronic device with two docked speaker accessories, according to one embodiment of the invention, in partially expanded modes.

FIG. 10 comprises FIGS. 10A, 10B, 10C, and 10D and shows one example of a set of speaker accessories 27 used in conjunction with accordions 10. FIG. 10A is an isometric view of mobile electronic device 1 with two docked speaker accessories 27, in partially expanded modes, resting on one edge of device 1 and one edge each of speaker accessory bodies 28. This extension configuration is useful for holding the device in a near-vertical position without blocking speaker accessories 27.

Figure 10B:
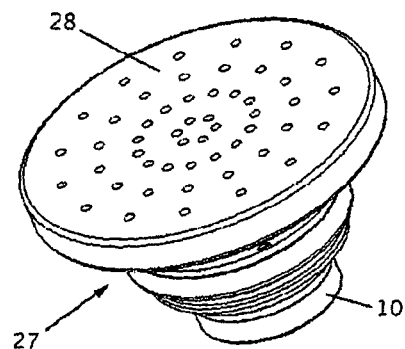
FIG. 10B is an isometric top view of the speaker accessory of FIG. 10A.

FIG. 10B is an isometric top view of speaker accessory 27, comprising speaker accessory body 28 and accordion 10.

Figure 10C:
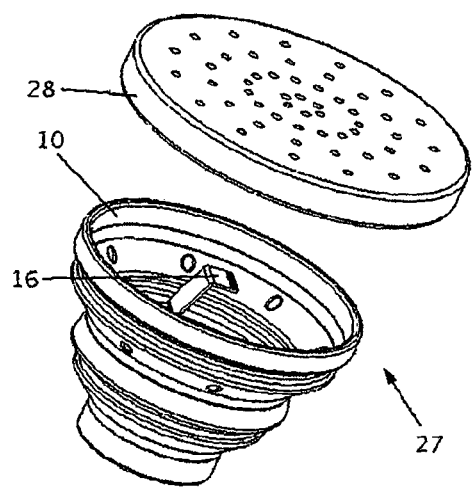
FIG. 10C is an exploded, isometric, top view of the speaker accessory of FIG. 10A.
Figure 10D:
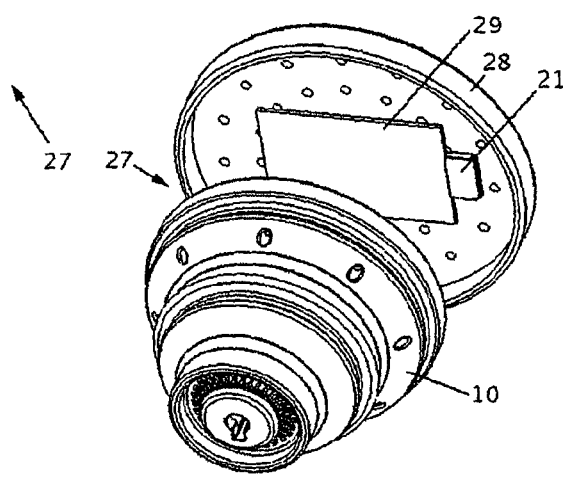
FIG. 10D is an exploded, isometric, bottom view of the speaker accessory of FIG. 10A.

FIG. 10C shows an isometric side exploded view of the speaker accessory 27 of FIG. 10B. Accordion flex circuit 16 can be seen within accordion 10, detached from speaker accessory body 28. FIG. 10D is an exploded, isometric, bottom view of speaker accessory 27. Piezoelectric speaker 29 connects to accessory connector 21, which will connect to flex circuit 16 via port 25 as shown in FIG. 9. As an example, given the device pin-out shown in Table 1, speaker 29 might use pins 1, 2, 4, and 5, comprising Ground, Power Out, Data Positive, and Data Negative. Under this pin-out arrangement, encoded data may be used for accessory detection. As another example, speaker 29 might use pins 1, 2, 6, 8, and 9, comprising Ground, Power Out, Detection, left channel analog audio, and right channel analog audio. Those skilled in the art will appreciate that many other pin-out arrangements are possible, including arrangements for a self-powered speaker accessory.

As an example, speaker accessory piezoelectric speaker 29 is a Murata VSLBF series; size 0.5 mm thick, 13 mm wide, 19 mm long; frequency range 200 Hz to 20 kHz; sound pressure level 93.5 dB+/−3.0 dB; resonant frequency 1150 Hz+/−20%; capacitance 1.5 µF+/−30%; maximal sinusoidal voltage 5.0 Vrms; operating temperature range −20 to 70° C.

Figure 11A:
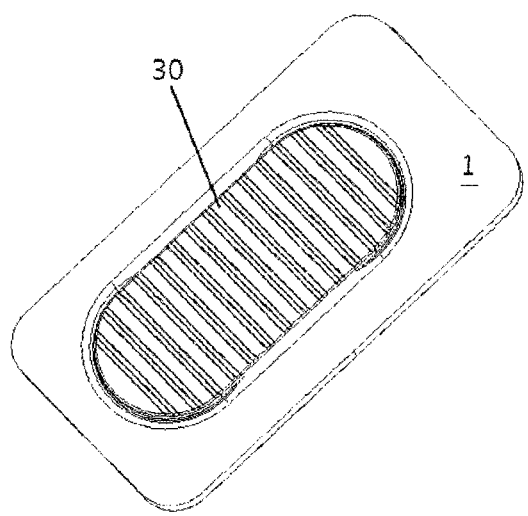
FIG. 11A is an isometric view of the mobile electronic device with a docked solar charging accessory, according to one embodiment of the invention.
Figure 11B:
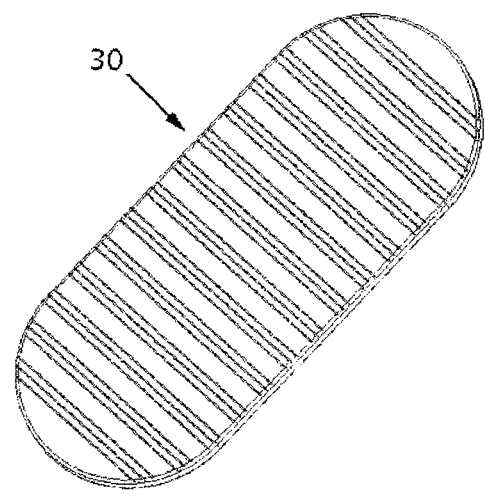
FIG. 11B is an isometric top view of the solar charging accessory of FIG. 11A.
Figure 11C:
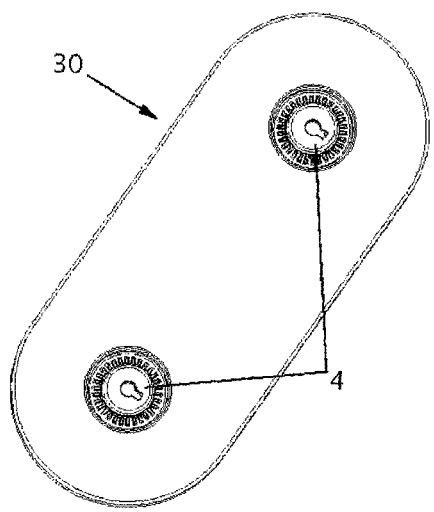
FIG. 11C is an isometric bottom view of the solar charging accessory of FIG. 11A.

FIG. 11 comprises FIGS. 11A, 11B, and 11C and shows one example of a solar charging accessory 30. FIG. 11A is an isometric view of mobile electronic device 1 with docked solar charging accessory 30. FIG. 11B is an isometric top view of solar charging accessory 30. FIG. 11C is a bottom view of solar charging accessory 30. In this embodiment, docking connectors 4 as shown in FIG. 2 are used. As an alternative, docking connectors 5 as shown in FIG. 3 could be used. Again taking the pin-out arrangement of Table 1 as an example, charging accessory 30 might connect to pins 1, 3, and 6, comprising Ground, Power In, and Detection/Configuration, respectively.

As an example, solar charger accessory 30 is a custom monocrystalline silicon solar cell encapsulated in epoxy resin; 5.5V; 60 mA; maximum power (Pm) 0.33 W.

Figure 12A:
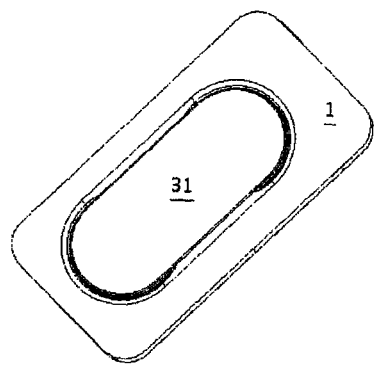
FIG. 12A is an isometric back view of the mobile electronic device with a docked supplemental battery accessory, according to one embodiment of the invention.
Figure 12B:
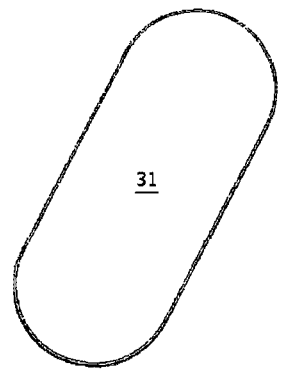
FIG. 12B is a top view of the supplemental battery accessory of FIG. 12A.
Figure 12C:
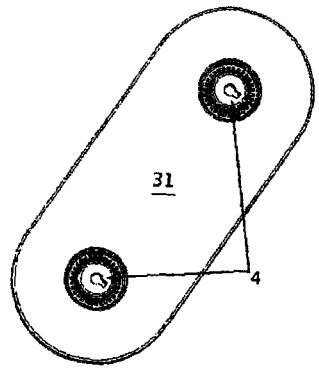
FIG. 12C is a bottom view of the supplemental battery accessory of FIG. 12A.

FIG. 12 comprises FIGS. 12A, 12B, and 12C and shows one example of a supplemental battery accessory 31. FIG. 12A is an isometric view of mobile electronic device 1 with docked supplemental battery accessory 31. FIG. 12B is a top view of supplemental battery accessory 31. FIG. 12C is a bottom view of supplemental battery accessory 31. As in the case of solar charging accessory 30, docking connectors 4 as shown in FIG. 2 are used, but docking connectors 5 as shown in FIG. 3 could also be used. Again taking the pin-out arrangement of Table 1 as an example, supplemental battery accessory 31 might connect to pins 1, 3, and 6, comprising Ground, Power In, and Detection/Configuration, respectively.

As an example, supplemental battery accessory 31 is a custom polymer Li-Ion, 3.7V, 800 mAh, 2.96 wh, UN approved.

Figure 13A:
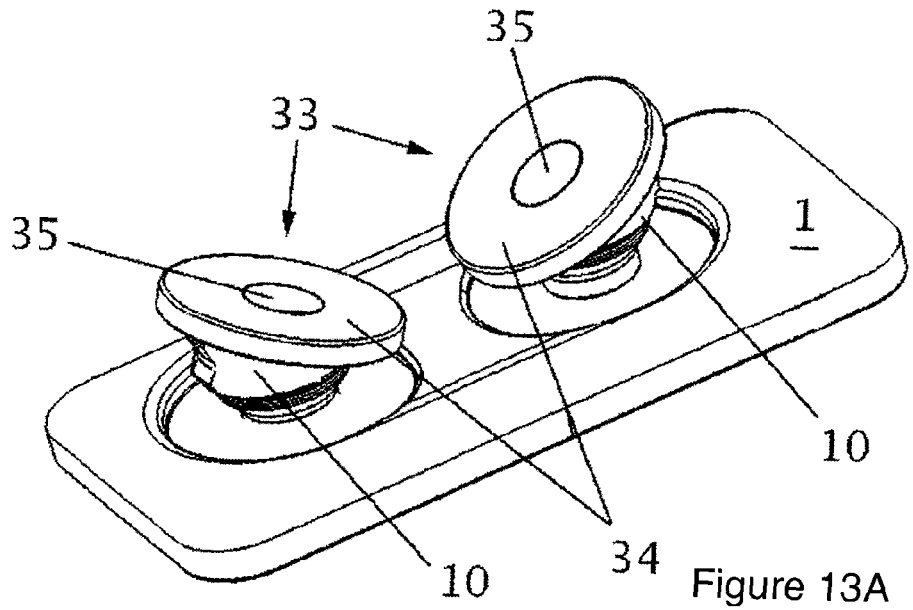
FIG. 13A is an isometric back view of the mobile electronic device with two docked electrophysiology accessories in one of their partially collapsed states, according to one embodiment of the invention.
Figure 13B:
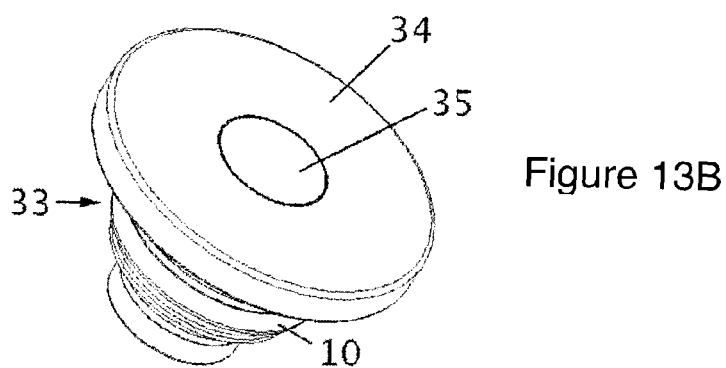
FIG. 13B is an isometric top view of the electrophysiology sensor accessory of FIG. 13A.
Figure 13C:
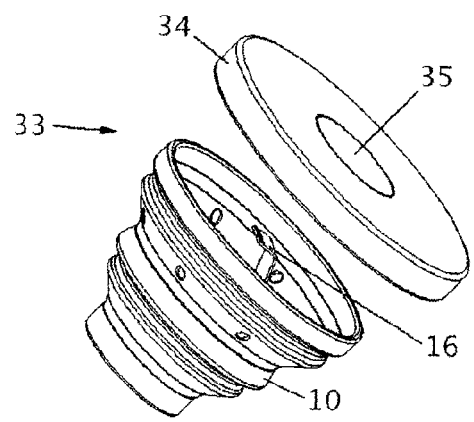
FIG. 13C is an isometric exploded side view of the electrophysiology sensor accessory of FIG. 13A.

FIG. 13 comprises FIGS. 13A, 13B, and 13C and shows one example of a set of electrophysiology sensor accessories used in conjunction with accordions 10. FIG. 13A is an isometric view of mobile electronic device 1 with two docked electrophysiology sensor accessories 33, in partially expanded modes. This extension configuration is useful for holding the pair of sensors against a person's chest for gathering electrophysiological data.

FIG. 13B is an isometric top view of electrophysiology sensor accessory 33 with fully expanded accordion 10.

FIG. 13C is an exploded, isometric, side view of electrophysiology sensor accessory 33 with fully expanded accordion 10. Accordion flex circuit 16 can be seen within accordion 10, detached from electrophysiology sensor accessory body 34. Electrophysiology sensor electrode 35 connects to accessory connector 21 (shown in FIG. 9C), which will connect to flex circuit 16 via port 25 as shown in FIG. 9. As an example, given the device pin-out shown in Table 1, electrophysiology sensor 33 might use pins 1, 2, 4, and 5, comprising Ground, Power Out, Data Positive, and Data Negative, respectively, in conjunction with accessory-mounted isolation or other safety components. Under this pin-out arrangement, encoded data may be used for accessory identification. Those skilled in the art will appreciate that many other pin-out arrangements are possible, including arrangements for a self-powered electrophysiology sensor accessory.

As an example, electrophysiology sensor accessory 33 is an electrocardiograph (ECG) sensor consisting of a silver chloride electrode, analog front end, digital-to-analog converter, microprocessor, and USB controller.

Figure 14A:
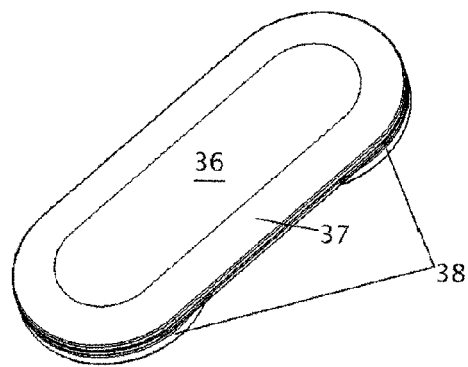
FIG. 14A is an isometric top view of a game controller accessory in its closed state, according to one embodiment of the invention.
Figure 14B:
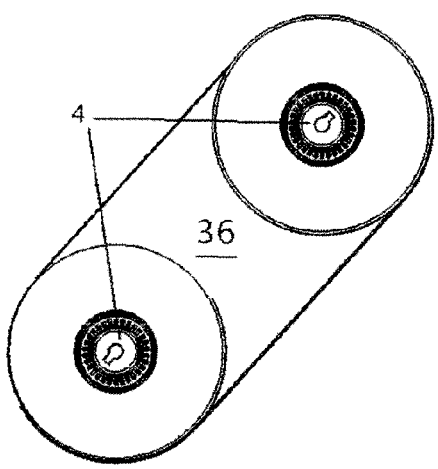
FIG. 14B is a bottom view of the game controller accessory of FIG. 14A.
Figure 14:
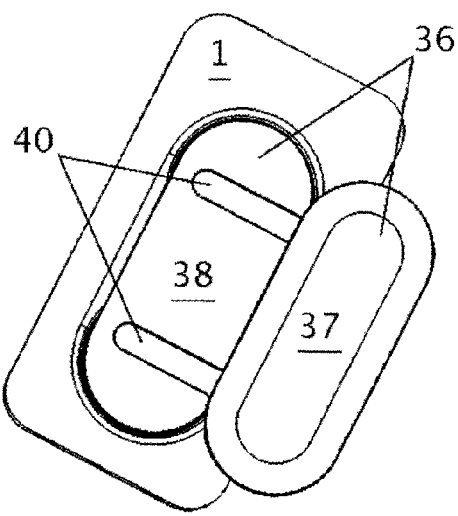
FIG. 14 comprises FIGS. 14A, 14B, 14C and 14D.

FIG. 14 comprises FIGS. 14A, 14B, 14C, and 14D and shows one example of a game controller accessory. FIG. 14A is an isometric top view of game controller accessory 36 in its closed state.

FIG. 14B is a bottom view of game controller accessory 36 of FIG. 14A. As in the case of solar charging accessory 30, docking connectors 4 as shown in FIG. 2 are used, but docking connectors 5 as shown in FIG. 3 could also be used.

FIG. 14C is a back view of mobile electronic device 1 with docked game controller accessory 36 in one of its partially open states. Game controller base tracks 40 allow game controller accessory sliding control panel 37 to slide into the partially open state shown in FIG. 14C.

Figure 14D:
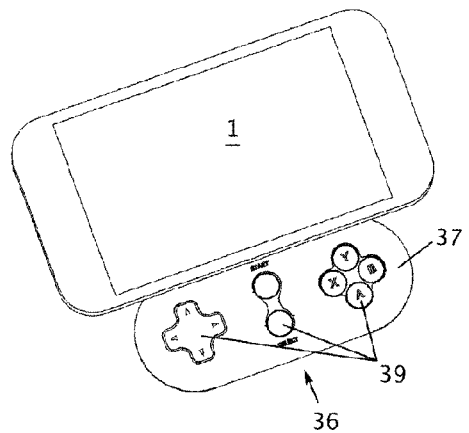
FIG. 14D is a front view of the mobile electronic device with the game controller accessory of FIG. 14A docked in its open state.

FIG. 14D is front view of mobile electronic device 1 with docked game controller accessory 36 in its fully open state. This state is convenient for holding the mobile electronic device 1 while operating the game controller accessory buttons 39. As an example, given the device pin-out shown in Table 1, game controller accessory 36 might use pins 1, 2, 4, and 5, comprising Ground, Power Out, Data Positive, and Data Negative, respectively. Under this pin-out arrangement, encoded data may be used for accessory identification. Those skilled in the art will appreciate that many other pin-out arrangements are possible. As an example, game controller accessory 36 is a thumb-operated keypad consisting of a mechanical-slide subassembly, user interface switches, a microcontroller, and a USB controller.

Figure 15A:
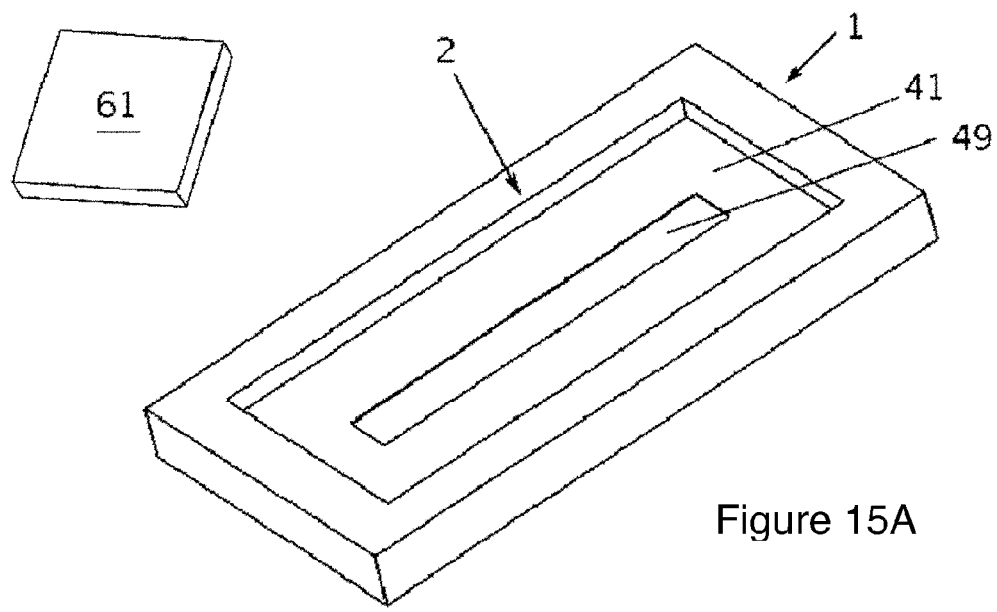
FIG. 15A is an isometric back view of a docking system comprising a generic docking accessory and a mobile electronic device with a generic docking platform formed on its back face.
Figure 15B:
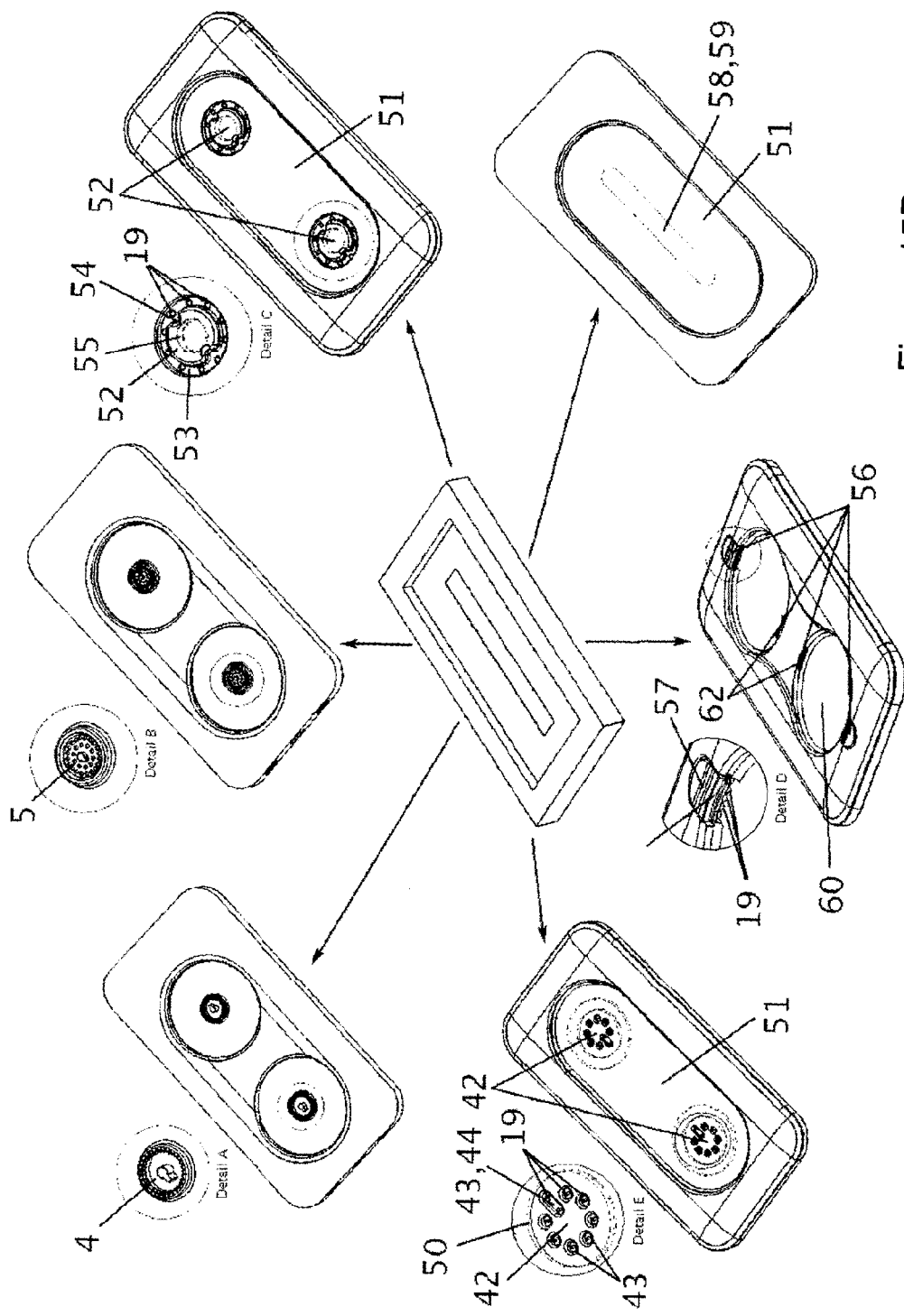
FIG. 15B is an isometric back view of the mobile electronic device of FIG. 15A with isometric back views of at least six embodiments of docking platform 2 radiating outward from the mobile electronic device of FIG. 15A. Moving clockwise from upper left, the first docking platform is the docking platform of FIG. 2; the second platform is the platform of FIG. 3; the third platform comprises an oval docking accessory cavity with two docking connectors, each comprising an annular magnetic element, for bonding with docking accessories, and ten electrical contacts embedded in an annular connector cavity; the fourth platform comprises an oval accessory cavity with a single magnetic element that is operable to bond simultaneously with multiple independent docking accessories that are operable to wirelessly transfer at least one of power or data between the accessories and the mobile electronic device; the fifth platform comprises an hourglass docking accessory cavity with two docking connectors, each comprising a fixed tab and a spring tab for forming detachable attachments with docking accessories, each connector further comprising five electrical contacts on an outer edge of the accessory cavity; the sixth platform comprises an oval docking accessory cavity with two docking connectors, each comprising nine electrical contacts formed inside eight connector cavities.

FIG. 15 comprises FIG. 15A and FIG. 15B. FIG. 15A is an isometric back view of a generic docking system comprising generic docking accessory 61 and mobile electronic device 1, device 1 forming docking platform 2, docking platform 2 comprising generic docking accessory cavity 41 and docking connection system 49. Docking accessory 61 might for instance be a battery, breathalyzer, massage paddle, LED light, camera flash, radio-frequency identification (RFID) tag, RFID reader, hand crank charger, hand pump charger, game controller, laser level, laser water purifier, scent generator, self-defense taser, lie detector device, credit card reader, robotic foot, low-energy display, thermometer, power adaptor, halitosis detector, hygrometer, digital scale, anemometer, water analysis tool, altimeter, barometer, wireless headset, mechanical keyboard, optical projection keyboard, proximity sensor, projector, remote control, memory card, headphones connector, accelerometer, pedometer, 3D motion tracking device, security perimeter, electrophysiology sensor, biofeedback device, diagnostic ultrasound device, therapeutic ultrasound, defibrillator, blood glucose monitor, pulse oximeter, finger print ID, laptop data lock, speaker, solar panel, walkie talkie, laser hair removal device, laser hair stimulator, or UV disinfector.

FIG. 15B is an isometric back view of the mobile electronic device 1 of FIG. 15A with isometric back views of at least six embodiments of docking platform 2 radiating outward from device 1. Clockwise from the upper left corner of FIG. 15B, the first embodiment of docking platform 2 is the platform of FIG. 2, with Detail A view of docking connector first embodiment 4. The second embodiment of docking platform 2, center top of FIG. 15B, is the platform of FIG. 3, with Detail B view of docking connector second embodiment 5. The third embodiment of docking platform 2, top right of FIG. 15B, comprises oval docking accessory cavity 51 and two docking connectors 52, each formed at one of the centers of the two circular ends of oval accessory cavity 51. Detail C is a detailed view of docking connector 52, connector 52 comprising annular connector cavity 53, cavity 53 further comprising a set of ten docking connector electrical contacts 19, this set of ten contacts comprising two duplicate sets of five electrical contacts 19, this pair of duplicate sets of contacts, together with two female aligning elements 54, enable attached docking accessories to be oriented in either of two positions separated by 180 degrees of rotation, connector 52 further comprising annular magnetic attachment system 55, attachment system 55 comprising a disc-shaped magnetic element formed beneath the surface of connector 52 to enable compatible docking accessories to form detachable magnetic attachments to connector 52. The fourth embodiment of docking platform 2, bottom right of FIG. 15B, comprises oval docking accessory cavity 51 and docking connector 58, connector 58 comprising magnetic attachment system 59, magnetic system 59 comprising a single elongated magnetic element formed beneath the bottom face of accessory cavity 51 to enable docking connector 58 to form a detachable attachment to multiple independent docking accessories, the docking accessories operable to wirelessly transmit and/or receive at least one of data or power with mobile device 1. Note that docking connector 58 comprises no electrical contacts. The fifth embodiment of docking platform 2, bottom center of FIG. 15B, comprises hourglass docking accessory cavity 60 and two docking connectors 56, connectors 56 each comprising fixed tab 62, spring tab 57, and docking connector electrical contacts 19. Detail D is a detailed view of spring tab 57 and five electrical contacts 19. Docking connector 56 is operable to form a detachable attachment to compatible docking accessories that are wedged between fixed tab 62 and spring tab 57. To release the docking accessories, spring tab 57 slides in the direction opposite the docking accessory. The sixth embodiment of docking platform 2, bottom left of FIG. 15B, comprises oval docking accessory cavity 51 and docking connector 42. Detail E is a detailed view of docking connector 42, connector 42 comprising eight docking connector cavities 43, nine electrical contacts 19, one female aligning element 44, docking connector magnetic attachment system 50, attachment system 50 comprising a single annular magnetic element formed beneath the surface of accessory cavity 51, for forming detachable attachments with compatible docking accessories.

Figure 16:
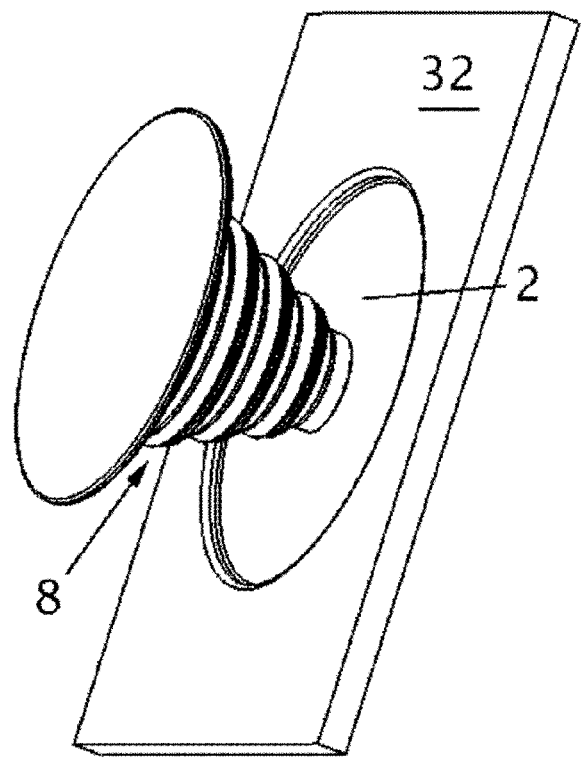
FIG. 16 is an isometric drawing showing an embodiment of the present invention implemented with a tablet device.

FIG. 16 is an isometric drawing showing an embodiment of the present invention implemented with a tablet device 32. In this embodiment, tablet device 32 is shown with one attached generic expanding docking accessory 8, whose expanding docking accessory body measures roughly five inches in diameter, and whose expanding docking accessory accordion expands roughly three inches away from the backside of tablet device 32.

While the exemplary preferred embodiments of the present invention are described herein with particularity, those skilled in the art will appreciate various changes, additions, and applications other than those specifically mentioned, which are within the spirit of this invention. For example, mobile electronic device 1 might be a mobile media tablet, as in FIG. 16. Docking platform 2 would then be sized accordingly, and the appropriate number and configuration of cavities provided. The platform, cavities, and docking connectors might have different shapes and sizes. The docking connectors might have different modes of attachment to docking accessories. Accessories might be self powered, and might communicate with the device wirelessly, for example via Bluetooth®. E.g., a digital scale accessory might be docked for transport, then removed and positioned next to the device, while communicating via Bluetooth®, as an object is placed on the scale and its weight displayed on the screen of the device. Accessories might be operable for wireless power transmission between themselves and the device.

What is claimed is:

1. A docking platform formed in a selected one of two largest-surface-area surfaces of a mobile electronic device comprising:
   a. a recessed docking accessory cavity formed within the selected surface;
   b. a docking connection system formed within the docking accessory cavity, the connection system constructed and arranged to form a detachable attachment to multiple independent docking accessories simultaneously, the connection system further constructed and arranged to enable the docking accessory cavity to be open only at the selected surface.

2. The docking platform of claim 1 further constructed and arranged to attach to a docking accessory without fixing any outer edges of the docking accessory.

3. The docking platform of claim 2 wherein the docking platform comprises two electrical contacts within the docking accessory cavity, the contacts electrically connected to electronics within the electronic device and constructed and arranged to allow electrical connection to the docking accessory when the docking accessory is attached to the docking connection system.

4. The docking platform of claim 3 wherein the mobile electronic device is operable to enable at least one of wireless data transmission or wireless power transmission between the docking accessory and the mobile electronic device.

5. The docking platform of claim 4 wherein the docking connection system forms a detachable mechanical bond with the docking accessory.

6. The docking platform of claim 4 wherein the docking connection system forms a detachable magnetic bond with the docking accessory.

7. The docking platform of claim 6, wherein the docking connection system comprises two docking connectors.

8. The docking platform of claim 7 wherein the docking connection system comprises generally circular docking connectors.

9. The docking platform of claim 8 wherein the docking accessory cavity is elongated.

10. The docking platform of claim 9 wherein the selected largest-surface-area surface is substantially flush with an outwardly facing surface of the docking accessory when the docking accessory is attached to the docking connection system.

11. A docking system comprising:
    A docking platform formed in a selected one of two largest-surface-area surfaces of a mobile electronic device comprising:
    a. a recessed docking accessory cavity formed within the selected surface;

b. a docking connection system formed within the selected surface, the connection system constructed and arranged to form a detachable attachment to multiple independent docking accessories simultaneously, the connection system further constructed and arranged to enable the docking accessory cavity to be open only at the selected surface;

c. a docking accessory constructed and arranged to form a detachable attachment to the docking connection system, the docking accessory further constructed to enable at least one of data or power transmission between the docking accessory and the mobile electronic device.

12. The docking system of claim 11 wherein no outer edges of the attached docking accessory are fixed by the attachment.

13. The docking system of claim 12 further including two electrical contacts within the docking accessory cavity, the contacts electrically connected to electronics within the mobile electronic device and constructed and arranged to allow electrical connection to the docking accessory when the docking accessory is attached to the docking connection system.

14. The docking system of claim 13, whereby the docking accessory comprises an accordion capable of extending outward from the selected surface and retracting back toward the selected surface, the accordion distal end attached to the docking accessory body.

15. The docking system of claim 14 further including a flex circuit formed within the accordion and connected between the electrical contacts within the docking accessory cavity and the docking accessory body.

16. The docking system of claim 15 wherein the docking accessory comprises a connector located inward radially from the outer edges of the docking accessory.

17. The docking system of 16 wherein the selected largest-surface-area surface is substantially flush with an outwardly facing surface of the docking accessory when the docking accessory is attached to the docking connection system.

18. The docking system of claim 17 wherein the docking accessory comprises one of the following: a speaker, a battery, an electrophysiology sensor, a game controller, or a solar charger.

19. A detachable docking accessory system for a mobile electronic device comprising:

a. a docking accessory body;

b. an accordion constructed to attach to a selected one of two largest-surface-area surfaces of the mobile electronic device and capable of extending outward from the selected surface and retracting back toward the selected surface, the accordion distal end attached to the docking accessory body; and c. the docking accessory body further comprising electronics operable to transfer at least one of data or power between the accessory body and the mobile electronic device.

20. The docking accessory system of claim 19 further comprising a flexible circuit formed within the accordion and configured to electrically connect the mobile electronic device and the docking accessory body.

* * * * *